(12) United States Patent
Oh et al.

(10) Patent No.: US 12,204,129 B2
(45) Date of Patent: Jan. 21, 2025

(54) STACKED WAVEGUIDES HAVING DIFFERENT DIFFRACTION GRATINGS FOR COMBINED FIELD OF VIEW

(71) Applicant: Magic Leap, Inc., Plantation, FL (US)

(72) Inventors: Chulwoo Oh, Sammamish, WA (US); Vikraman Parthiban, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/471,740

(22) Filed: Sep. 21, 2023

(65) Prior Publication Data

US 2024/0012191 A1 Jan. 11, 2024

Related U.S. Application Data

(62) Division of application No. 17/590,482, filed on Feb. 1, 2022, now Pat. No. 11,803,003, which is a division
(Continued)

(51) Int. Cl.
*G02B 5/18* (2006.01)
*F21V 8/00* (2006.01)
(Continued)

(52) U.S. Cl.
CPC ......... *G02B 6/0016* (2013.01); *G02B 5/1833* (2013.01); *G02B 5/1842* (2013.01);
(Continued)

(58) Field of Classification Search
CPC .. G02B 5/3016; G02B 5/1833; G02B 5/1842; G02B 27/4261; G02B 27/0172; G02B 2027/0123
See application file for complete search history.

(56) References Cited

U.S. PATENT DOCUMENTS 4,991,924 A 2/1991 Shankar et al.
5,808,797 A 9/1998 Bloom et al.
(Continued)

FOREIGN PATENT DOCUMENTS

CN 104656259 5/2015
EP 0415735 3/1991
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005, in 3 pages.
(Continued)

*Primary Examiner* — Paisley L Wilson
(74) *Attorney, Agent, or Firm* — Fish & Richardson P.C.

(57) ABSTRACT

In one aspect, an optical device comprises a plurality of waveguides formed over one another and having formed thereon respective diffraction gratings, wherein the respective diffraction gratings are configured to diffract visible light incident thereon into respective waveguides, such that visible light diffracted into the respective waveguides propagates therewithin. The respective diffraction gratings are configured to diffract the visible light into the respective waveguides within respective field of views (FOVs) with respect to layer normal directions of the respective waveguides. The respective FOVs are such that the plurality of waveguides are configured to diffract the visible light within a combined FOV that is continuous and greater than each of the respective FOVs.

13 Claims, 25 Drawing Sheets

Related U.S. Application Data of application No. 15/926,920, filed on Mar. 20, 2018, now Pat. No. 11,269,144.

(60) Provisional application No. 62/474,529, filed on Mar. 21, 2017.

(51) Int. Cl.

| | | |
|---|---|---|
| *G02B 6/10* | (2006.01) | |
| *G02B 27/00* | (2006.01) | |
| *G02B 27/01* | (2006.01) | |
| *G02B 27/42* | (2006.01) | |
| *G02F 1/29* | (2006.01) | |
| *H04N 9/31* | (2006.01) | |

(52) U.S. Cl.
CPC ............. *G02B 6/0076* (2013.01); *G02B 6/10* (2013.01); *G02B 27/0093* (2013.01); *G02B 27/0172* (2013.01); *G02B 27/0189* (2013.01); *G02B 27/4261* (2013.01); *G02F 1/292* (2013.01); *H04N 9/3129* (2013.01); *G02B 2027/0123* (2013.01); *G02B 2027/0127* (2013.01); *G02B 2027/0134* (2013.01); *G02B 2027/0185* (2013.01); *G02B 2027/0187* (2013.01); *G02F 2201/305* (2013.01); *G02F 2203/22* (2013.01)

(56) References Cited

U.S. PATENT DOCUMENTS

| | | |
|---|---|---|
| 6,188,462 B1 | 2/2001 | Lavrentovich et al. |
| 6,850,221 B1 | 2/2005 | Tickle |
| 6,982,818 B2 | 1/2006 | Riza et al. |
| D514,570 S | 2/2006 | Ohta |
| 7,206,107 B2 | 4/2007 | Levola |
| 7,375,784 B2 | 5/2008 | Smith et al. |
| 7,573,640 B2 | 8/2009 | Nivon et al. |
| 7,705,943 B2 | 4/2010 | Kume et al. |
| 8,233,204 B1 | 7/2012 | Robbins et al. |
| 8,339,566 B2 | 12/2012 | Escuti et al. |
| 9,081,426 B2 | 7/2015 | Armstrong |
| 9,195,092 B2 | 11/2015 | Escuti et al. |
| 9,215,293 B2 | 12/2015 | Miller |
| D752,529 S | 3/2016 | Loretan et al. |
| 9,345,402 B2 | 5/2016 | Gao |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,191,288 B2 | 1/2019 | Singer et al. |
| 10,895,784 B2 | 1/2021 | Oh et al. |
| 2003/0147112 A1 | 8/2003 | Mukawa |
| 2004/0184163 A1 | 9/2004 | Nishioka et al. |
| 2005/0232530 A1 | 10/2005 | Kekas |
| 2005/0253112 A1 | 11/2005 | Kelly et al. |
| 2006/0028436 A1 | 2/2006 | Armstrong |
| 2006/0126179 A1* | 6/2006 | Levola ............ G02B 27/4277 359/563 |
| 2006/0227283 A1 | 10/2006 | Ooi et al. |
| 2007/0081123 A1 | 4/2007 | Lewis |
| 2008/0043334 A1 | 2/2008 | Itzkovitch et al. |
| 2008/0169479 A1 | 7/2008 | Xu et al. |
| 2011/0242461 A1 | 10/2011 | Escuti et al. |
| 2012/0127062 A1 | 5/2012 | Bar-Zeev et al. |
| 2012/0162549 A1 | 6/2012 | Gao et al. |
| 2012/0206812 A1 | 8/2012 | Saito et al. |
| 2012/0242918 A1 | 9/2012 | Valyukh et al. |
| 2013/0082922 A1 | 4/2013 | Miller |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0208234 A1 | 8/2013 | Lewis |
| 2013/0242262 A1 | 9/2013 | Lewis |
| 2013/0322810 A1 | 12/2013 | Robbins |
| 2014/0055740 A1 | 2/2014 | Spaulding et al. |
| 2014/0071539 A1 | 3/2014 | Gao |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0218468 A1 | 8/2014 | Gao et al. |
| 2014/0218801 A1 | 8/2014 | Simmonds et al. |
| 2014/0232993 A1 | 8/2014 | Kim |
| 2014/0267420 A1 | 9/2014 | Schowengerdt |
| 2014/0293389 A1 | 10/2014 | Akutsu et al. |
| 2014/0306866 A1 | 10/2014 | Miller et al. |
| 2015/0002528 A1 | 1/2015 | Bohn et al. |
| 2015/0016777 A1 | 1/2015 | Abovitz et al. |
| 2015/0103306 A1 | 4/2015 | Kaji et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0241705 A1 | 8/2015 | Abovitz et al. |
| 2015/0268415 A1 | 9/2015 | Schowengerdt et al. |
| 2015/0293409 A1 | 10/2015 | Usukura et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0373459 A1 | 12/2017 | Weng et al. |
| 2018/0046859 A1 | 2/2018 | Jarvenpaa |
| 2018/0113309 A1 | 4/2018 | Robbins et al. |
| 2018/0143485 A1 | 5/2018 | Oh |
| 2018/0164627 A1 | 6/2018 | Oh |
| 2018/0217395 A1 | 8/2018 | Lin et al. |
| 2018/0239147 A1 | 8/2018 | Schowengerdt |
| 2018/0239177 A1 | 8/2018 | Oh |

FOREIGN PATENT DOCUMENTS

| | | |
|---|---|---|
| EP | 1308767 | 5/2003 |
| EP | 2887128 | 6/2015 |
| EP | 3062142 | 8/2016 |
| JP | 2007-011057 | 1/2007 |
| JP | 2015-049376 | 3/2015 |
| JP | 2015-105990 | 6/2015 |
| JP | 2015-118273 | 6/2015 |
| KR | 10-2001-0067116 | 7/2001 |
| KR | 10-2015-0071612 | 6/2015 |
| KR | 10-2015-0097634 | 8/2015 |
| WO | WO 2010/090184 | 8/2010 |
| WO | WO 2016/194961 | 12/2016 |
| WO | WO 2018/094079 | 5/2018 |
| WO | WO 2018/106963 | 6/2018 |
| WO | WO 2018/156779 | 8/2018 |
| WO | WO 2018/156784 | 8/2018 |

(56) References Cited

FOREIGN PATENT DOCUMENTS

| WO | WO 2018/175343 | 9/2018 |
|----|----------------|--------|
| WO | WO 2018/175488 | 9/2018 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995, in 262 pages.
Bimber, et al., "Spatial Augmented Reality—Merging Real and Virtual Worlds," 2005, in 393 pages. https://web.media.mit.edu/~raskar/book/BimberRaskarAugmentedRealityBook.pdf.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Crawford, et al.: "Liquid-crystal diffraction gratings using polarization holography alignment techniques," Journal of Applied Physics 98, 123102, 2005.
Dierking, I.: "Chiral Liquid Crystals: Structures, Phases, Effects," Symmetry, (Jun. 2014) 6(2): 444-472.
Escuti, M. et al., "39.4: Polarization-independent switching with high contrast from a liquid crystal polarization grating," SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
International Preliminary Report on Patentability for PCT Application No. PCT/US18/19257, issued Aug. 27, 2019, in 6 pages (MLEAP.057WO2).
International Preliminary Report on Patentability for PCT Application No. PCT/US2017/062063, issued May 21, 2019, in 8 pages (MLEAP.085WO).
International Preliminary Report on Patentability for PCT Application No. PCT/US2017/065182, issued Jun. 11, 2019, in 5 pages (MLEAP.099WO1).
International Preliminary Report on Patentability for PCT Application No. PCT/US2018/023425, issued Sep. 24, 2019, in 14 pages (MLEAP.109WO).
International Search Report and Written Opinion for PCT Application No. PCT/US 18123178, mailed Aug. 3, 2018, in 19 pages (MLEAP.099WO3).
International Search Report and Written Opinion for PCT Application No. PCT/US18/19250, mailed Jun. 29, 2018, in 23 pages (MLEAP.057WO1).
International Search Report and Written Opinion for PCT Application No. PCT/US18/19257, mailed Jul. 2, 2018, in 6 pages (MLEAP.057WO2).
International Search Report and Written Opinion for PCT Application No. PCT/US2017/062063, mailed Jan. 25, 2018, in 8 pages (MLEAP.085WO).
International Search Report and Written Opinion for PCT Application No. PCT/US2017/65182, mailed Apr. 6, 2018, in 5 pages (MLEAP.099WO1).
International Search Report and Written Opinion for PCT Application No. PCT/US2018/023425, mailed Jun. 22, 2018, in 14 pages (MLEAP.109WO).
Invitation to Pay Additional Fees and, Where Applicable, Protest Fee for PCT Application No. PCT/US18/19250, mailed May 2, 2018, in 3 pages (MLEAP.057WO1).
Invitation to Pay Additional Fees and, Where Applicable, Protest Fee for PCT Application No. PCT/US18/19257, mailed May 3, 2018, in 3 pages (MLEAP.057WO2).
Invitation to Pay Additional Fees and, Where Applicable, Protest Fee for PCT Application No. PCT/US18/23178, mailed Jun. 4, 2018, in 3 pages (MLEAP.099WO3).
Invitation to Pay Additional Fees and, Where Applicable, Protest Fee for PCT Application No. PCT/US2017/65182, mailed Feb. 14, 2018, in 3 pages (MLEAP.099WO1).
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and TA Furness, pp. 258-288, Oxford University Press, New York (1995).
Kim, J. et al., "Wide-angle, nonmechanical beam steering with high throughput utilizing polarization gratings," Applied Optics, vol. 50, No. 17, Jun. 10, 2011, in 4 pages.
Komanduri, et al., "Multi-twist retarders: broadband retardation control using self-aligning reactive liquid crystal layers," Optical Society of America, Optics Express, vol. 21, No. 1, Jan. 14, 2013, in 17 pages.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, nonlinear, and soft matter physics, May 25, 2007, in 8 pages.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-independent modulation for projection displays using small-period LC polarization gratings", Journal of the Society for information display, vol. 15, No. 8, pp. 589-594, Aug. 2007, in 7 pages.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al., Negative dispersion of birefringence in two-dimensionally self-organized smectic liquid crystal and monomer thin film, Optics Letters, vol. 39, No. 17, in 5 pages, Sep. 1, 2014.
Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.
Nikolova et al., "Diffraction Efficiency and Selectivity of Polarization Holographic Recording", Optica Acta: Int'l J Optics (1984) 31 (5):579-588.
Office Action in Chinese Appln. No. 201880020303.6, dated Nov. 10, 2021, 13 pages (with English translation).
Office Action in Japanese Appln. No. 2019-548409, dated Apr. 4, 2022, 7 pages (with English translation).
Office Action in Japanese Appln. No. 2019-548409, dated Oct. 27, 2022, 7 pages (with English translation).
Office Action in Japanese Appln. No. 2022-107069, dated May 30, 2023, 13 pages (with English translation).
Office Action in Korean Appln. No. 10-2019-7030458, dated Jun. 15, 2023, 22 pages (with English translation).
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.
Oh, C. et al., "Numerical analysis of polarization gratings using the finite-difference time-domain method", Physical review A, vol. 76, Oct. 12, 2007, in 8 pages.
Oh, C. et al., "Polarization-Independent Modulation using Standard LCDs and Polymer PGs", 2008, in 6 pages.

(56) References Cited

OTHER PUBLICATIONS

Oh, C. et al., 16.2: Polarization-Independent Modulation Using Standard Liquid Crystal Microdisplays and Polymer Polarization Gratings, IDRC, 2008, in 4 pages.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Yang et al. Negative dispersion of birefringence of smectic liquid crystal-polymer composite: dependence on the constituent molecules and temperature, Optical Society of America, Optics Express 2466, vol. 23, No. 3, Feb. 9, 2015, in 6 pages.

* cited by examiner

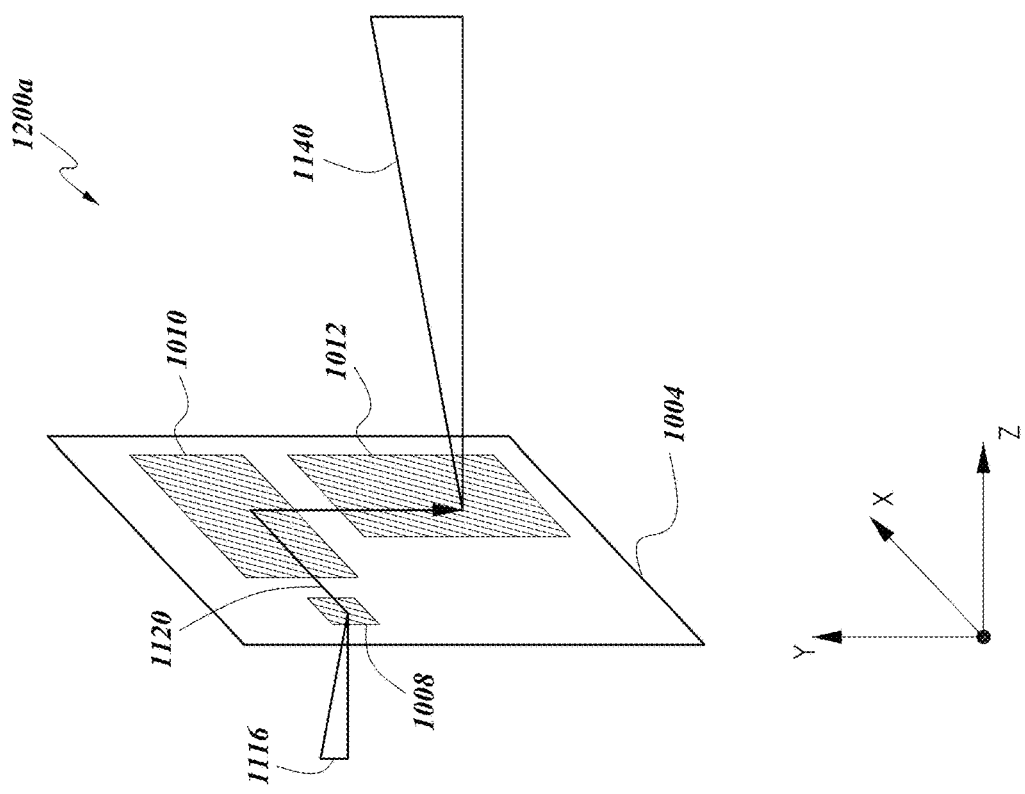
FIG. 13A

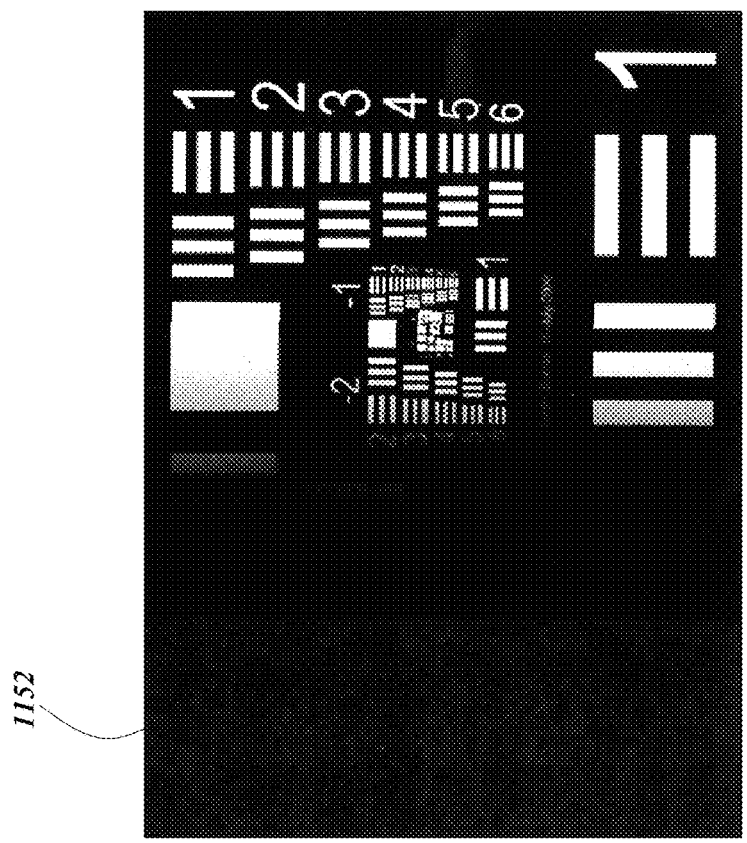
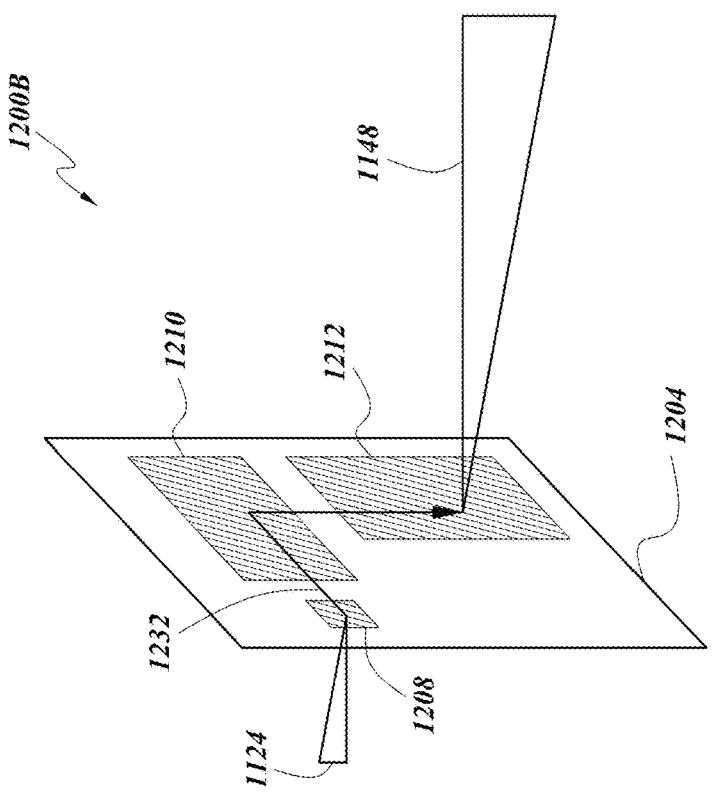
FIG. 13B

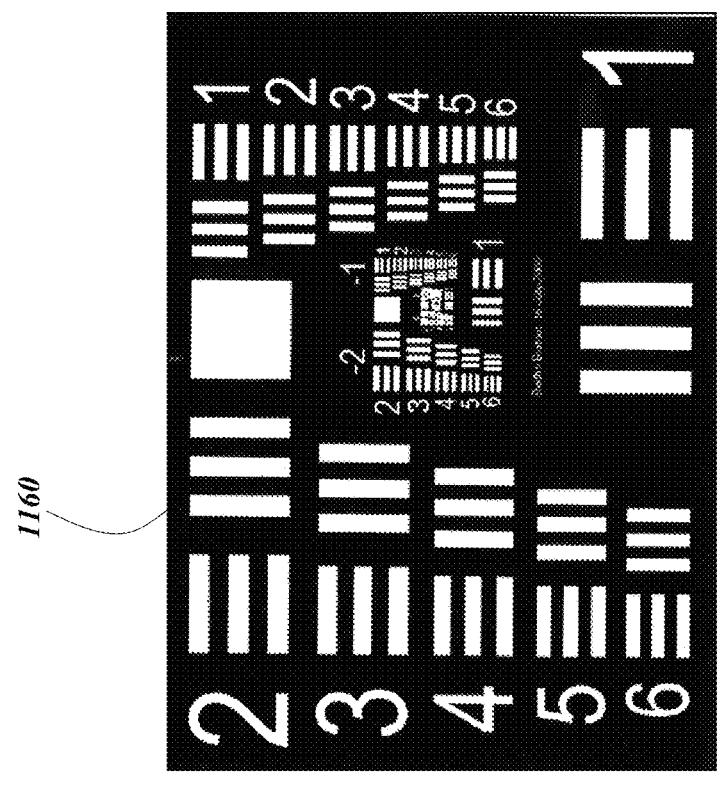
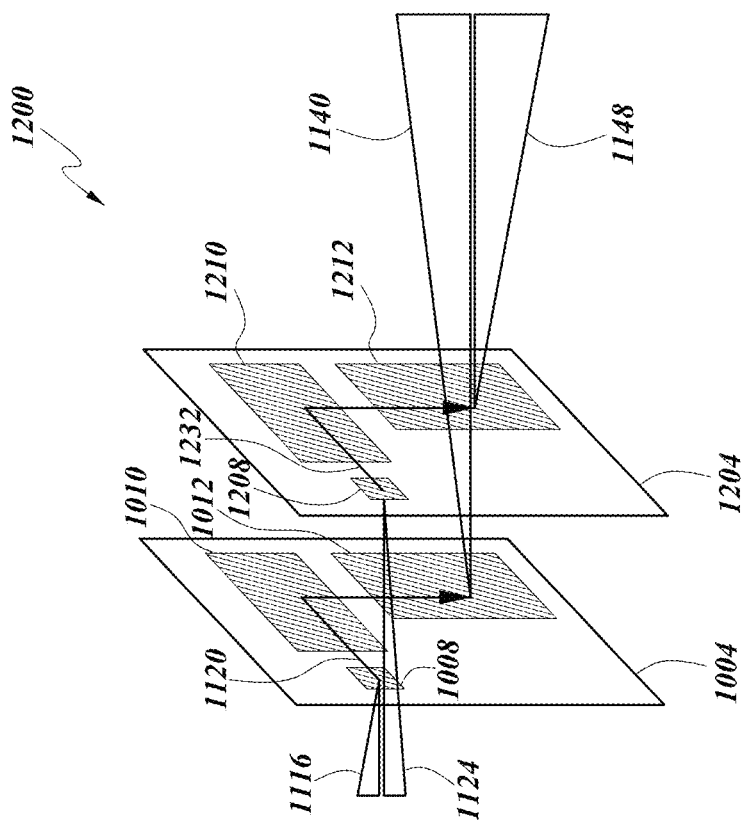
FIG. 13C

STACKED WAVEGUIDES HAVING DIFFERENT DIFFRACTION GRATINGS FOR COMBINED FIELD OF VIEW

INCORPORATION BY REFERENCE

This application is a divisional of U.S. patent application Ser. No. 17/590,482 filed on Feb. 1, 2022 entitled "STACKED WAVEGUIDES HAVING DIFFERENT DIFFRACTION GRATINGS FOR COMBINED FIELD OF VIEW," which is a divisional of U.S. patent application Ser. No. 15/926,920 filed on Mar. 20, 2018 entitled "STACKED WAVEGUIDES HAVING DIFFERENT DIFFRACTION GRATINGS FOR COMBINED FIELD OF VIEW," now U.S. Pat. No. 11,269,144, which claims the priority benefit of U.S. Provisional Patent Application No. 62/474,529 filed on Mar. 21, 2017 entitled "STACKED WAVEGUIDES HAVING DIFFERENT DIFFRACTION GRATINGS FOR COMBINED FIELD OF VIEW," which are incorporated by reference herein in their entirety.

BACKGROUND

Field

The present disclosure relates to display systems and, more particularly, to augmented reality display systems comprising diffractive devices based on cholesteric liquid crystal.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

In a first aspect, an optical device comprises a plurality of waveguides formed over one another and having formed thereon respective diffraction gratings, wherein the respective diffraction gratings are configured to diffract visible light incident thereon into respective waveguides, such that visible light diffracted into the respective waveguides propagates therewithin. The respective diffraction gratings are configured to diffract the visible light incident on the respective waveguides into the respective waveguides within respective field of views (FOVs) with respect to layer normal directions of the respective waveguides. The respective FOVs are such that the plurality of waveguides are configured to diffract the visible light within a combined FOV that is continuous and greater than each of the respective FOVs.

In a second aspect, an optical system comprises a first waveguide having formed thereon a first diffraction grating. The first diffraction grating has a first period and is configured to diffract light having a first color that is incident on the first waveguide within a first FOV. The optical system additionally comprises a second waveguide having formed thereon a second diffraction grating. The second diffraction grating has a second period and is configured to diffract light having the first color that is incident on the second waveguide within a second FOV. The first and second diffraction gratings are configured to diffract the light having the first color within respective field of views (FOVs) into the respective waveguides with respect to layer normal directions of the respective waveguides. The respective FOVs are such that the first and second waveguides are configured to diffract the visible light having the first color within a combined FOV that is continuous and greater than each of the first and second FOVs.

In a third aspect, a display device comprises a first waveguide having formed thereon a first diffraction grating comprising liquid crystals, wherein the first diffraction grating is configured to diffract part of light having a first color incident thereon into the first waveguide. The first diffraction grating is additionally configured to pass therethrough part of the light having the first color incident thereon. The first diffraction grating is further configured to pass therethrough light having a second color. The display device additionally comprises a second waveguide having formed thereon a second diffraction grating comprising liquid crystals, wherein the second diffraction grating is configured to diffract the light having the second color into the second waveguide. The second diffraction grating is further configured to diffract the part of the light having the first color that has passed through the first diffraction grating into the second waveguide.

In a fourth aspect, a head-mounted display device is configured to project light to an eye of a user to display augmented reality image content. The head-mounted display device comprises a frame configured to be supported on a head of the user. The head-mounted display device additionally comprises a display disposed on the frame. At least a portion of the display comprises a plurality of waveguides. The waveguides are transparent and disposed at a location in front of the user's eye when the user wears the head-mounted display device such that the transparent portion transmits light from a portion of an environment in front of the user to the user's eye to provide a view of the portion of the environment in front of the user. The display further comprises one or more light sources and a plurality of diffraction gratings in the display configured to couple light from the light sources into the waveguides in the display. The waveguides and the diffraction gratings in the display comprise the waveguides and the diffraction gratings according to any one of first to third aspects.

BRIEF DESCRIPTION OF THE DRAWINGS

FIG. 13A illustrates a schematic view of one of the component waveguides of the display device illustrated in FIGS. 12A and 12B, where the one of the component waveguides has a first period, and the resulting image corresponding to a first field of view.

FIG. 13B illustrates a schematic view of one of the component waveguides of the display device illustrated in FIGS. 12A and 12B, where the one of the component waveguides has a second period, and the resulting image corresponding to a second field of view.

FIG. 13C illustrates a schematic view of the stacked waveguides of the display device illustrated in FIGS. 12A and 12B and the resulting image which corresponds to a combined or an aggregate field of view larger than the first and second fields of view individually.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" display is a display that may be mounted on the head of a viewer.

Figure 1:
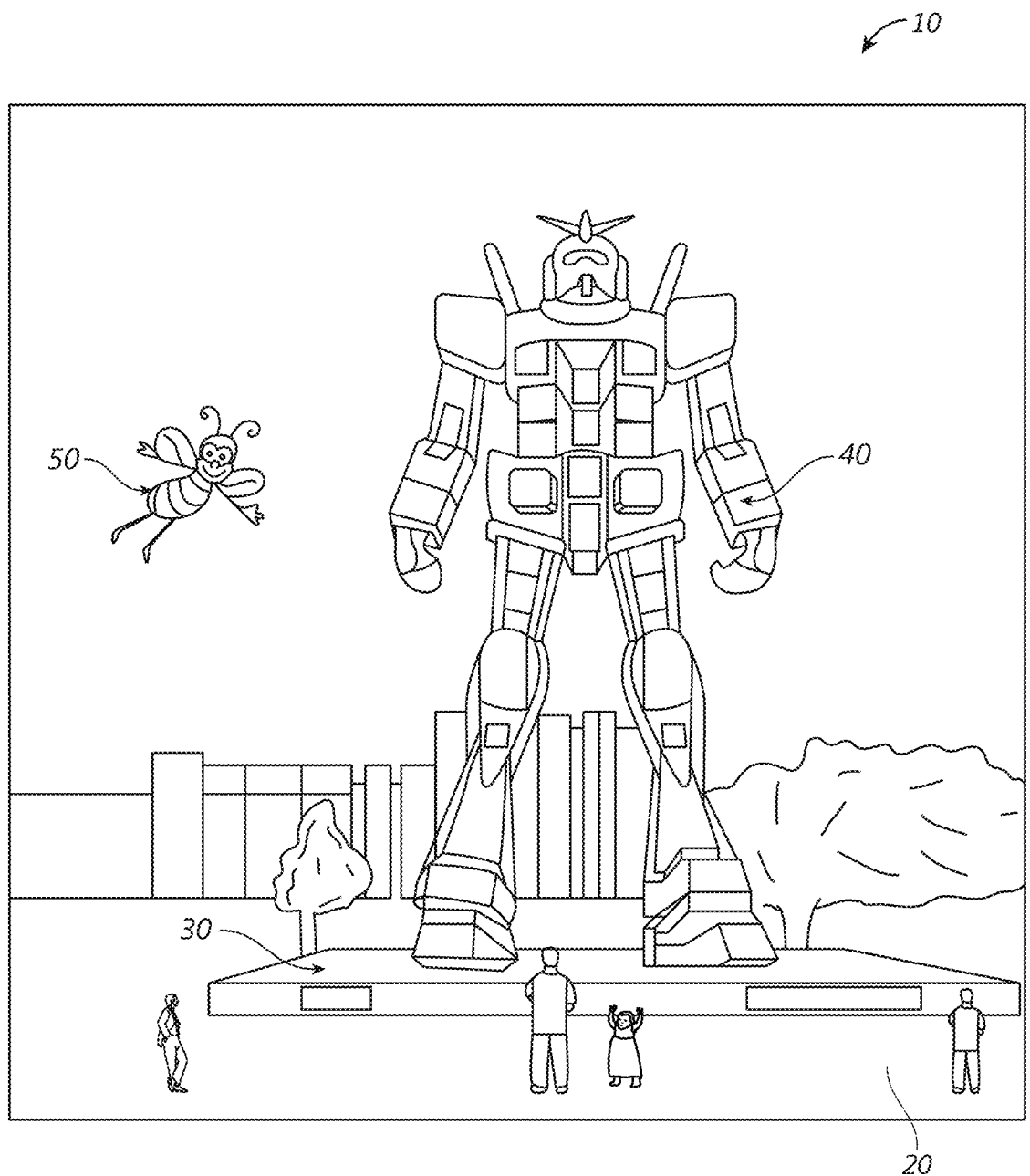
FIG. 1 illustrates a user's view of augmented reality (AR) through an AR device.
Figure 2:
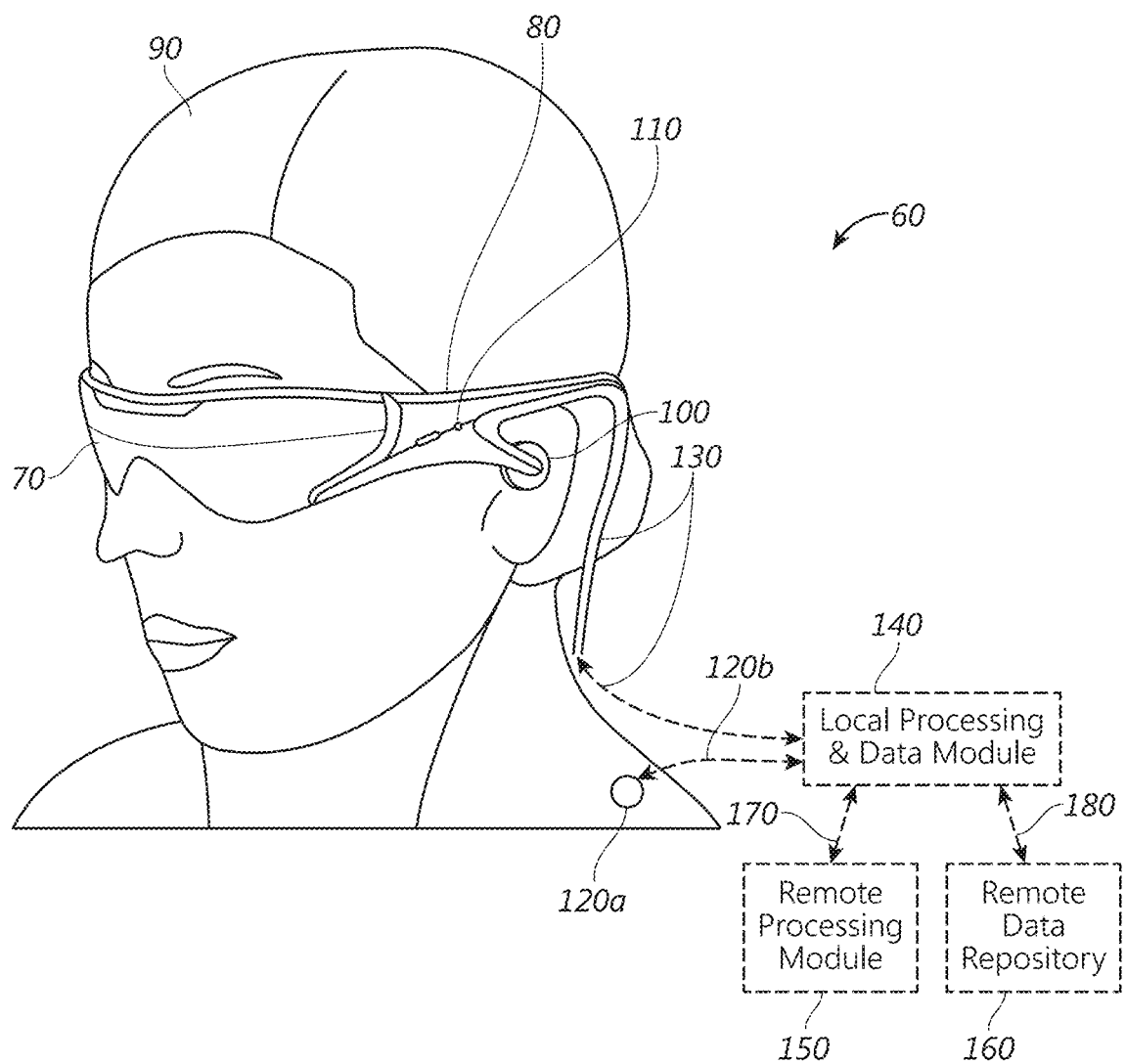
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
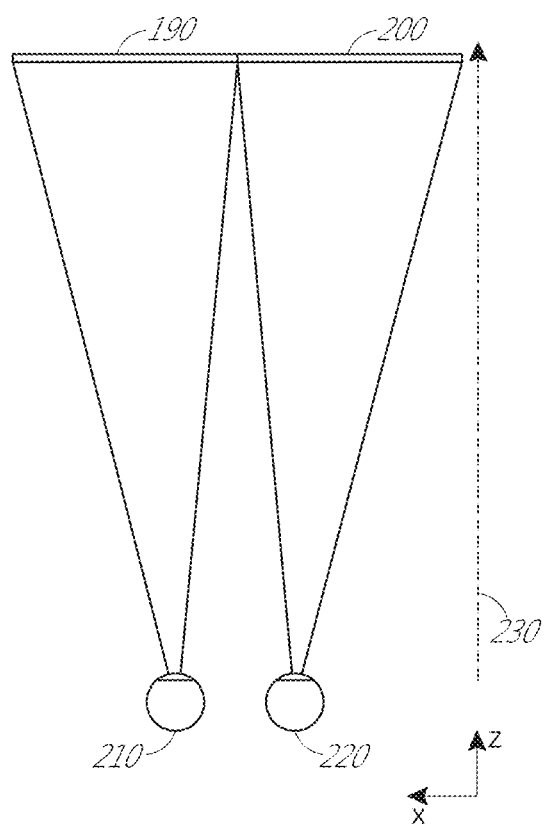
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
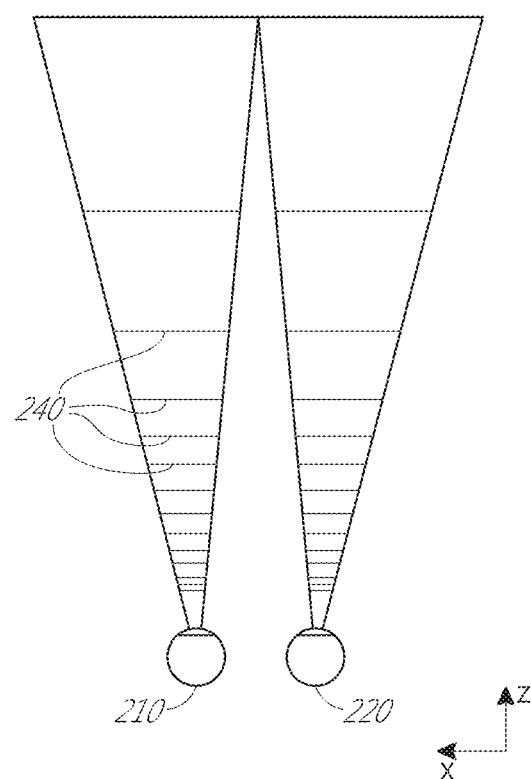
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
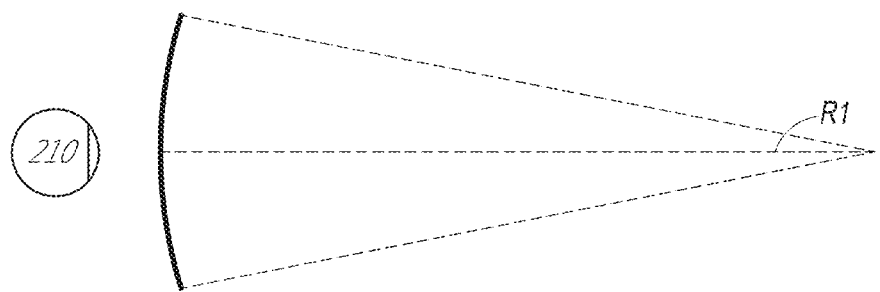
FIGS. 5A-5C illustrate relationships between radius of curvature and focal radius.
Figure 5B:
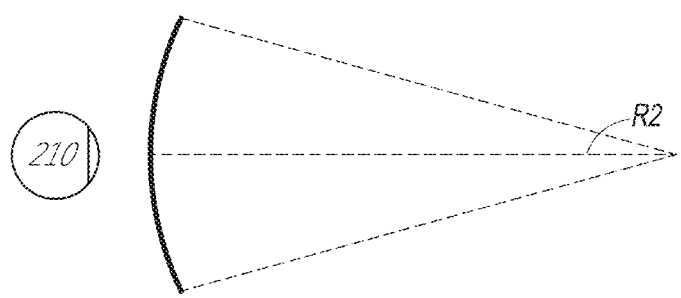
Figure 5C:
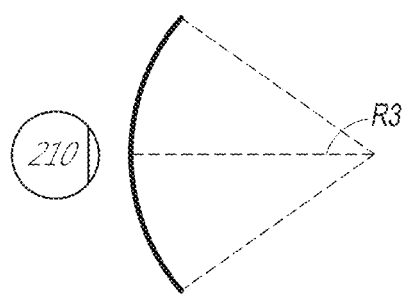

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
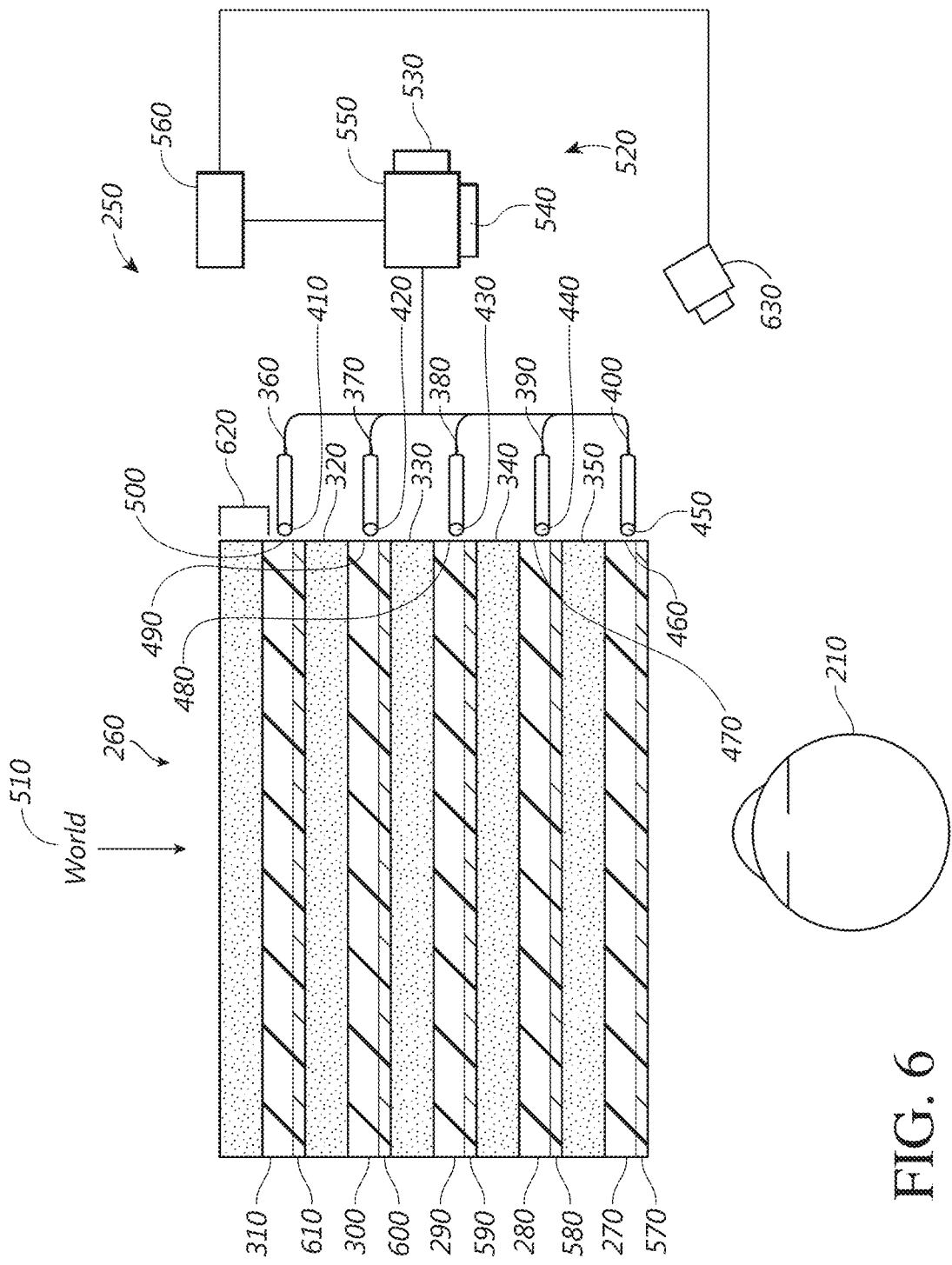
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
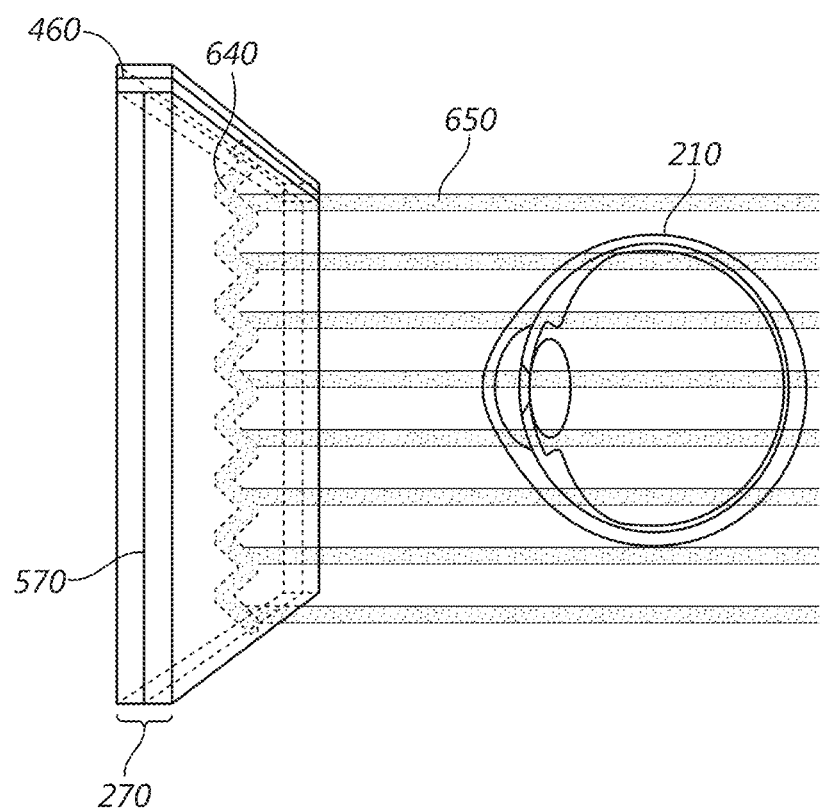
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
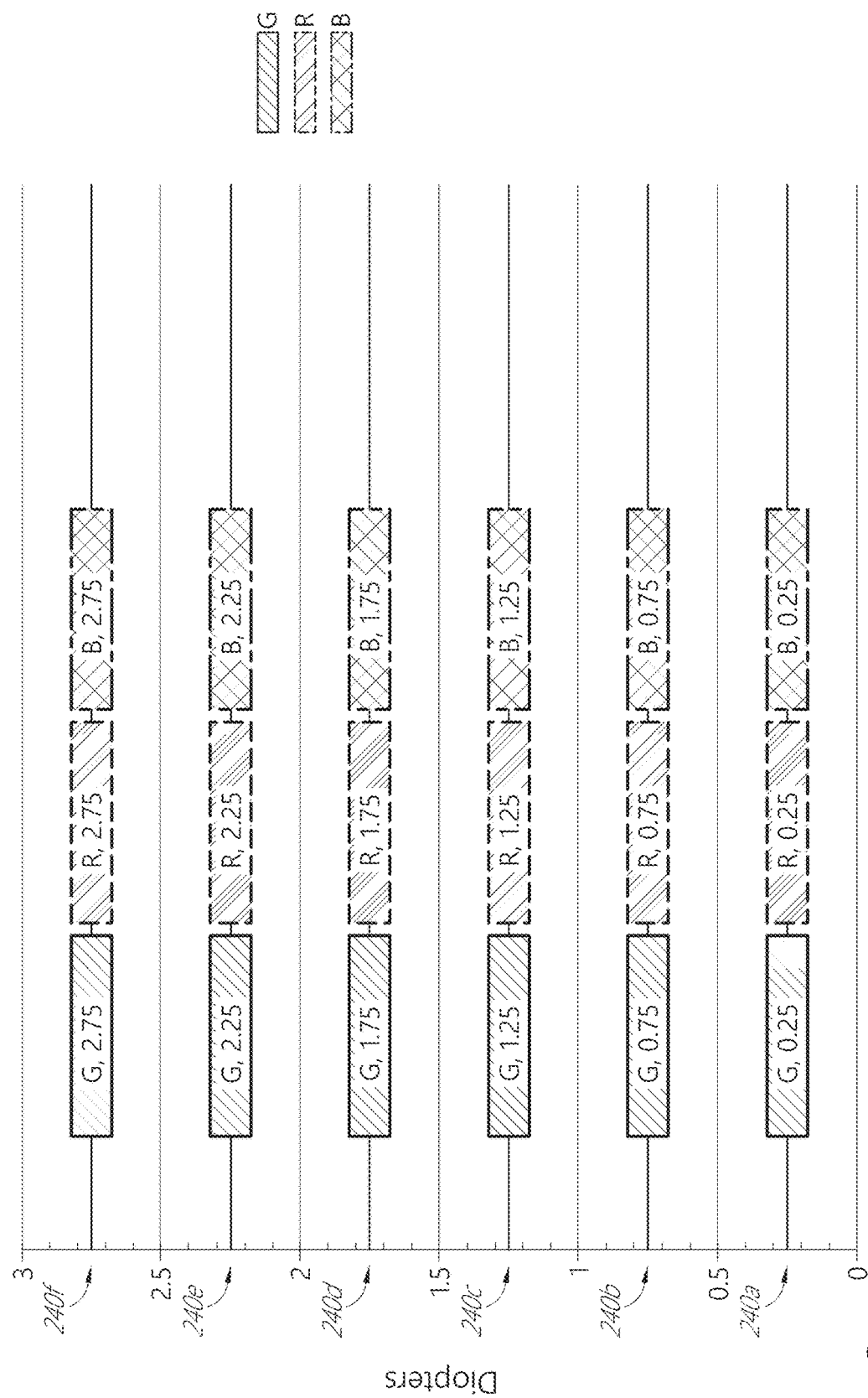
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
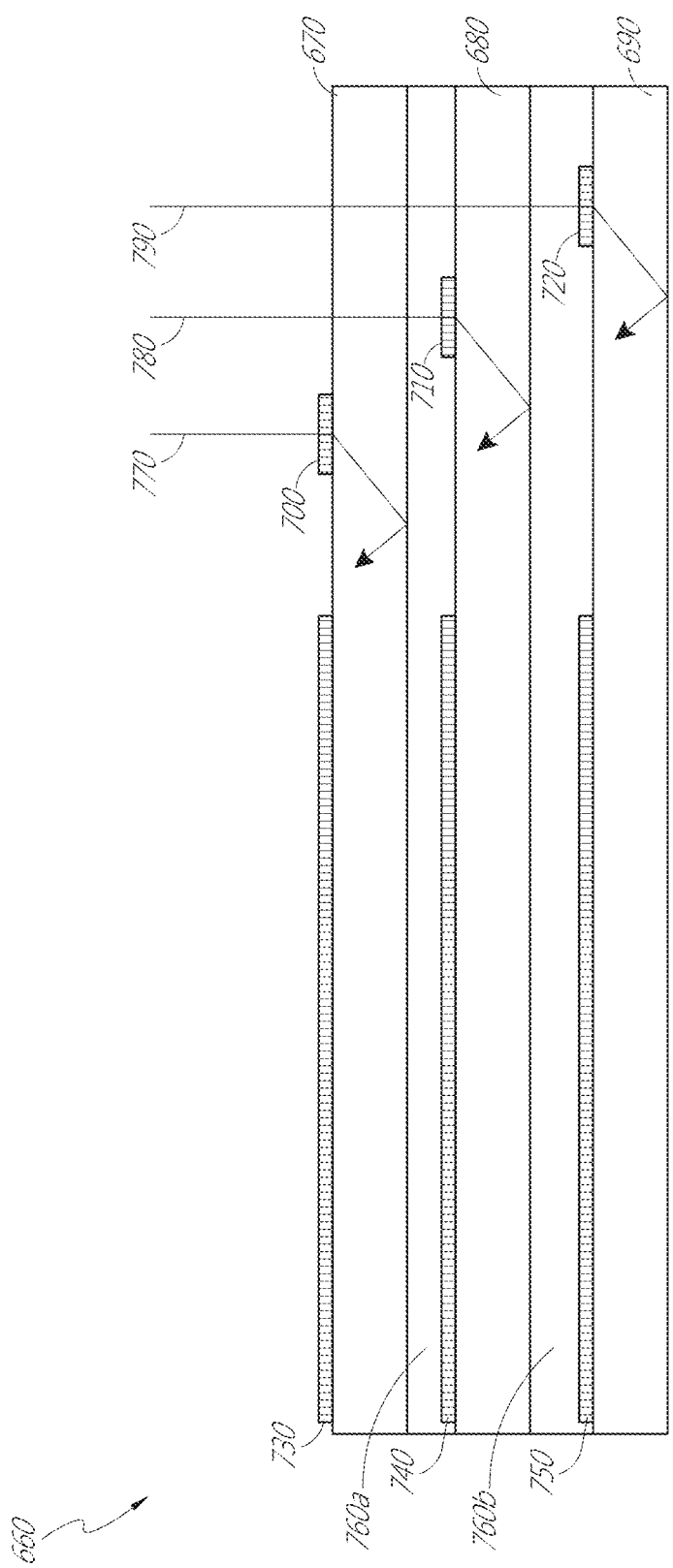
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 1242 and 1244, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
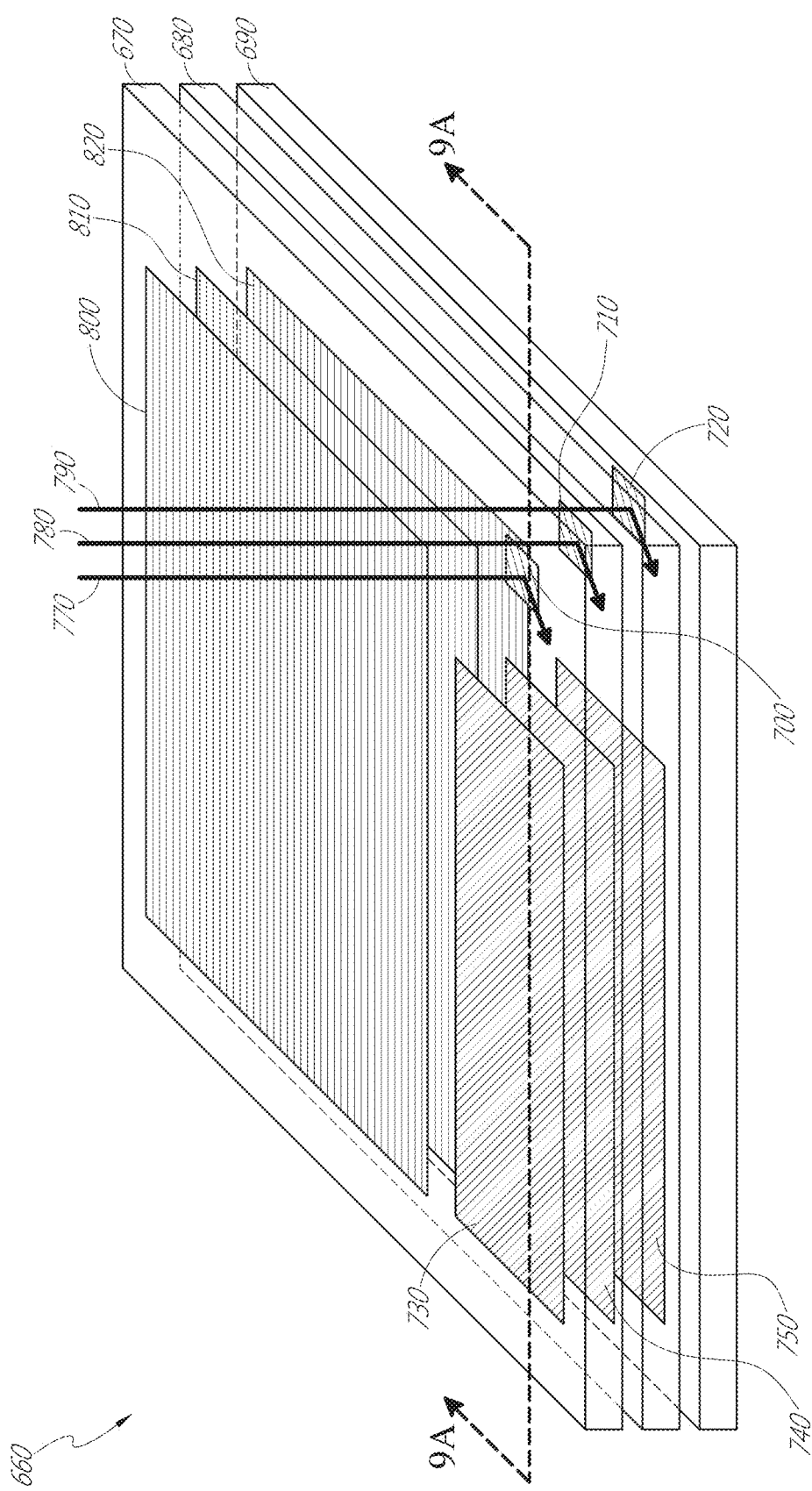
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
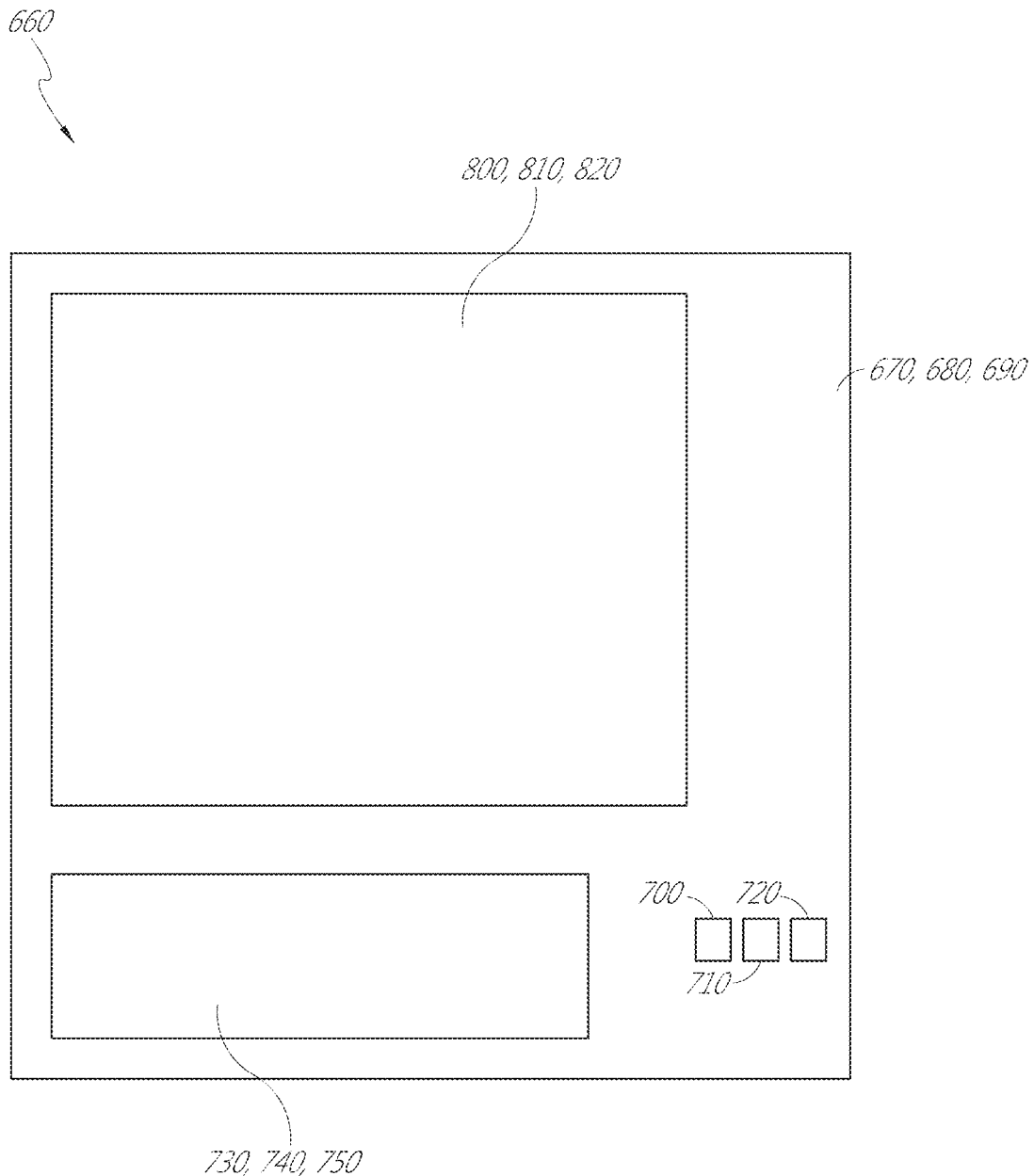
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Stacked Waveguides with Combined Field of View

Providing an immersive experience to a user of waveguide-based display systems, e.g., various semitransparent or transparent display systems configured for virtual/augmented/mixed display applications described supra, depends on, among other things, various characteristics of light coupling into the waveguides of the display systems. For example, virtual/augmented/mixed display having increase field of view can potentially enhance the viewing experience. The field of view of the display depends on the angle of light output by the plurality of waveguides in the waveguides stack that are included in the eyepiece through which the viewer sees images projected into his or her eye. The angle of light output from the plurality of waveguides in turn depends, at least in part, on the acceptance angle of light coupled into the waveguide. As discussed above, in-coupling optical elements such as in-coupling gratings may be employed to couple light into the grating. In certain cases, however, only light having a limited range of angles can be coupled into a given waveguide using a given grating. This limited range of angles of acceptance of light by the waveguide, may also limit the range of angle output by the waveguide into the eye of the wearer, and thus potentially reduce the field of view for the wearer. This particular limitation, as well as designs for increasing the acceptance angle and thus the field of view, of the display are discussed below.

As described supra, e.g., in reference to FIGS. 6 and 7, display systems according to various embodiments described herein may include optical elements, e.g., in-coupling optical elements, out-coupling optical elements, and light distributing elements, which may include diffraction gratings. For example, as described above in reference to FIG. 7, light 640 that is injected into the waveguide 270 at the input surface 460 of the waveguide 270 propagates within the waveguide 270 by total internal reflection (TIR). At points where the light 640 impinges on the out-coupling optical element 570, a portion of the light exits the waveguide as beamlets 650. In some implementations, any of the optical elements 570, 580, 590, 600, 610 can be configured as a diffraction grating.

To achieve desirable characteristics of in-coupling of light into (or out-coupling of light from) the waveguides 270, 280, 290, 300, 310, the optical elements 570, 580, 590, 600, 610 configured as diffraction gratings can be formed of a material having structures that are configured to control various optical properties, including diffraction properties. The desirable diffraction properties include, among other properties, spectral selectivity, angular selectivity, polarization selectivity, high spectral bandwidth and high diffraction efficiencies, and a wide field of view (FOV), among other properties.

To achieve one or more of these and other advantages, various examples described herein include a plurality of waveguides formed over one another and having formed thereon respective diffraction gratings. The diffraction gratings are configured to diffract visible light incident thereon into respective waveguides, such that visible light diffracted into the waveguides propagates within each of the waveguides, for example, by total internal reflection. The diffraction gratings are configured to diffract the visible light into the respective waveguides when the visible light is incident thereon within respective ranges of angles, or field of views (FOVs) (e.g., with respect to layer normal directions of the respective waveguides). The respective FOVs provided by the individual diffraction gratings and waveguides are such that the waveguides, when stacked together, have an aggregate acceptance angle or FOV that is continuous and greater than the individual FOVs provided by the diffraction gratings and waveguides separately.

As described herein, visible light may include light having one or more wavelengths in various color ranges, including red, green, or blue color ranges. As described herein, red light may include light of one or more wavelengths in the range of about 620-780 nm, green light may include light of one or more wavelengths in the range of about 492-577 nm, and blue light may include light of one or more wavelengths in the range of about 435-493 nm. Thus, visible may include light of one or more wavelengths in the range of about 435 nm-780 nm.

As described herein, structures configured to diffract light, such as diffraction gratings, may diffract light in a transmission mode and/or reflection mode. As described herein, structures that are configured to diffract light in transmission mode refer to structures in which the intensity of diffracted light on the opposite side of the structures as the light-incident side is greater, e.g., at least 10% greater, 20% greater or 30% greater, compared to the intensity of diffracted light on the same side of the structures as the light-incident side. Conversely, structures that are configured to diffract light in reflection mode refer to structures in which the intensity of diffracted light on the same side of the structures as the light-incident side is greater, e.g., at least 10% greater, 20% greater or 30% greater, compared to the intensity of diffracted light on the opposite side of the structures as the light-incident side.

Figure 10:
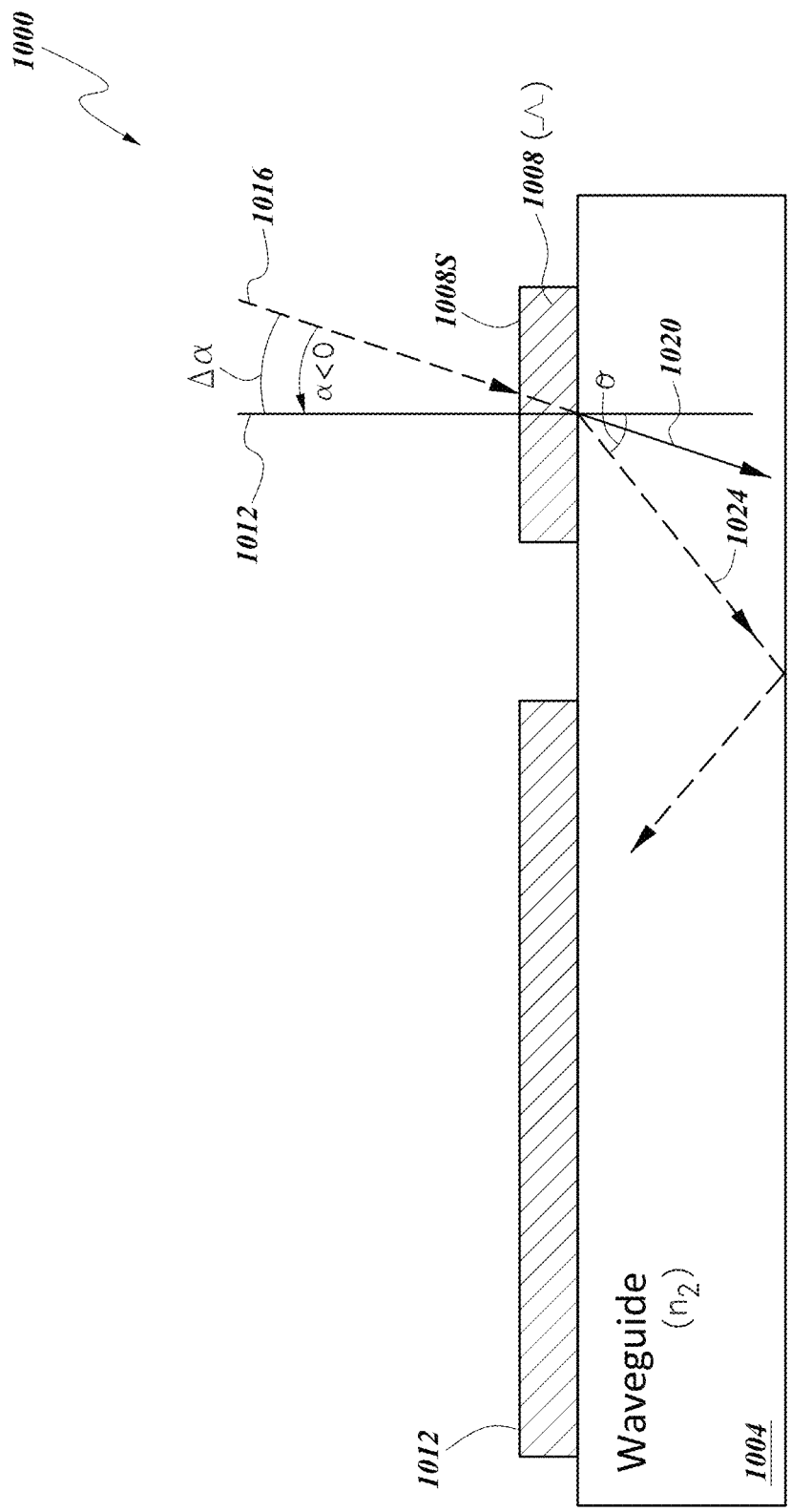
FIG. 10 illustrates a cross-sectional view of a waveguide having disposed thereon a diffraction grating showing the acceptance angle of the waveguide, $\Delta\alpha$. This acceptance angle may be referred as to a field of view (FOV) herein.

FIG. 10 illustrates a cross-sectional view of a portion of a display device 1000 comprising a waveguide 1004 having formed thereon a diffraction grating 1008, according to some embodiments. The coupled diffraction grating 1008 is configured to diffract light having a wavelength in the visible spectrum such that the light is guided within the waveguide 1004. The waveguide 1004 can correspond to one of waveguides 670, 680, 690 described above with respect to FIGS. 9A-9C, for example. The diffraction grating 1008 can correspond to, e.g., an in-coupling optical element (700, 710, 720, FIGS. 9A-9C). The display device 1000 additionally includes an optical element 1012, which can correspond to the light distributing elements (730, 740, 750, FIGS. 9A-9C), for example, or one of out-coupling optical elements (800, 810, 820, FIGS. 9A-9C), for example.

In operation, when an incident light beam 1016, e.g., visible light, is incident on the diffraction grating 1008 at an angle of incidence α measured relative to a plane normal 1012 that is normal or orthogonal to the surface 1008S extending in the y-z plane, the diffraction grating 1008 at least partially diffracts the incident light beam 1016 as a diffracted light beam 1024 at a diffraction angle θ measured relative to the surface normal 1012 and at least partially transmits the incident light as a transmitted light beam 1020. As described herein, a light beam that is incident at an angle in a clockwise direction relative to the plane normal 1012 (i.e., on the right side of the plane normal 1012) as in the illustrated embodiment is referred to as having a negative α (α<0), whereas a light beam that is incident at an angle in a counter-clockwise direction relative to the plane normal 1012 (i.e., on the left side of the plane normal) is referred to as having a positive α (α>0). When the diffracted light beam 1024 is diffracted at a diffraction angle θ that exceeds a critical angle $\theta_{TIR}$ for occurrence of total internal reflection in the waveguide 1004, the diffracted light beam 1024 propagates in along the x-axis under total internal reflection (TIR) until the diffracted light beam 1024 reaches the optical element 1012, which can correspond to one of light distributing elements (730, 740, 750, FIGS. 9A-9C), for example, or one of out-coupling optical elements (800, 810, 820, FIGS. 9A-9C), for example.

As further described elsewhere in the specification, a suitable combination of the material and the structure of the diffraction grating 1016 may be selected such that a particular range (Δα) of angle of incidence a, referred to herein as a range of angle of acceptance or a field-of-view (FOV), is obtained. According to various embodiments, the diffraction grating 1008 and the waveguide 1004 are arranged such that Δα exceeds 20 degrees (e.g., +/−10 degrees), 30 degrees (e.g., +/−15 degrees), 40 degrees (e.g., +/−20 degrees) or 50 degrees (e.g., +/−25 degrees), or is within a range of angles defined by any of these values, including symmetric and asymmetric ranges about the plane normal 1012, e.g., at 0 degrees. As described herein. the desired range Δα may be described by a range of angles spanning negative and/or positive values of α, outside of which the diffraction efficiency falls off by more than 10%, 25%, more than 50%, or more than 75%, relative to the diffraction efficiency at α=0. Having the Δα within the range in which the diffraction efficiency is relatively high and constant may be desirable, e.g., where a uniform intensity of diffracted light is desired within the Δα. Thus, the Δα is associated with the angular bandwidth of the diffraction grating 1016, such that the incident light beam 1016 within the Δα is efficiently diffracted by the diffraction grating 1016 at a diffraction angle θ with respect to the surface normal 1012 (e.g., the y-z plane) that exceeds $\theta_{TIR}$, and that the diffracted light propagates within the waveguide 1004 under total internal reflection (TIR).

In various embodiments, the diffraction grating 1008 (and the optical element 1012) is formed of a material whose refractive index ($n_1$) or an effective refractive index is higher than the refractive index $n_2$ of the waveguide 1004; i.e., $n_1 > n_2$. In some embodiments, the waveguide 1004 may correspond to the waveguides 310, 300, 290, 280, 270 (FIG. 6), for example, and/or waveguides 670, 680, and 690

(FIGS. 9A-9C), for example. In some implementations, the material of the waveguide 1004 according to embodiments has a refractive index that is greater than that of air but less than $n_1$, e.g., 1.5, 1.6, 1.7, 1.8, 1.9, or in a range defined by any of these values, which may provide benefits for increasing the $\Delta\alpha$ of a display that forms an image by outputting light from the waveguide 1004. Examples of materials for forming the waveguide 1004 include silica glass (e.g., doped silica glass), silicon oxynitride, transition metal oxides (e.g., hafnium oxide, tantalum oxide, zirconium oxide, niobium oxide, lithium niobate, aluminum oxide (e.g., sapphire)), plastic, a polymer, or other materially optically transmissive to visible light having, e.g., a suitable refractive index as described herein.

According to certain embodiments, the diffraction grating 1008 may have periodic structures having a period $\Lambda_a$. The period $\Lambda_a$ repeats, or substantially repeats, at least twice at regular intervals across the waveguide 1004 in a lateral direction (e.g., x, y directions). In other words, the period $\Lambda_a$ may be the distance between identical points of directly neighboring repeating structures. According to various embodiments, the period $\Lambda_a$ may correspond to that formed by arrangements of liquid crystals, as described elsewhere in the application. In various embodiments, the $\Lambda_a$ may be smaller than the wavelength that the grating 1008 is configured to diffract, and may be smaller than a wavelength, or any wavelength, in the range of about 435 nm-780 nm. In some embodiments configured to diffract at least red light, the $\Lambda_a$ may be less than a wavelength (or any wavelength) in the range of about 620-780 nm. In some other embodiments configured to diffract at least green light, the $\Lambda_a$ may be less than a wavelength (or any wavelength) in the range of about 492-577 nm. In some other embodiments configured to diffract at least blue light, the $\Lambda_a$ may be less than a wavelength (or any wavelength) in the range of about 435-493 nm. Alternatively, according to various embodiments, the $\Lambda_a$ may be in the range of 10 nm to 1 µm, including 10 nm to 500 nm or 300 nm to 500 nm. It will be appreciated that the diffraction gratings disclosed herein may be utilized to diffract light and may be part of the display system 250 (FIG. 6) and that the display system 250 may be configured to direct light to the gratings having a narrow band of wavelengths. In some embodiments, the $\Lambda_a$ for a given diffraction grating is less than the smallest wavelength of the band of wavelengths that a light source of the display system is configured to direct to the diffraction grating.

Without being bound to any theory, in some embodiments, the $\Lambda_a$ may have a value that is less than a ratio $m\lambda/(\sin\alpha + n_2\sin\theta)$, where m is an integer (e.g., 1, 2, 3 . . . ) and each of $\alpha$, $n_2$ and $\theta$ has a value described throughout the specification. For example, a may be within the range $\Delta\alpha$ exceeding 40 degrees, $n_2$ may be in the range of 1-2, and $\theta$ may be in the range of 40-80 degrees.

In some embodiments, the $\Lambda_a$ may be substantially constant across the surface 1008S of the grating 1008. However, embodiments are not so limited and in some other embodiments, $\Lambda_a$ may vary across the surface 1008S.

As described above, the field-of-view (FOV), or $\Delta\alpha$, corresponds to a range of angles of incident light that can be coupled into a waveguide and cause TIR. As discussed above, this range of angles can also affect and correspond to the range of angles of light output by the waveguides and the eyepiece and thus affect the field-of-view experienced by the viewer when viewing images through the display. In order to couple incident light into the waveguide and to propagate therewithin under TIR, the light incident on the waveguide 1004 may be directed within the range of acceptance angles or FOV, $\Delta\alpha$, which, among other things, is dependent on the refractive index $n_2$ of the material of the waveguide 1004, and the refractive index $n_1$ of the material of the diffraction grating 1008. For example, the FOV ($\Delta\alpha$) of a waveguide 1004 comprising a glass substrate with a refractive index of 1.5 can be about 30 degrees. When the gratings are designed to produce a symmetric FOV, the FOV or range of accepted angles for the glass substrate can be within ±15 degrees in one dimension. In the following, various embodiments are described in which a combined range of accepted angles or an effective FOV for a stack of waveguides is extended relative to the individual component waveguides, which may have different and/or smaller FOVs relative to the effective FOV of the stack of waveguides.

As described herein, a combined, aggregate or an effective FOV of a plurality of waveguides, e.g., a stack of waveguides, refers to, for a given color, a range of continuous FOV resulting from the combination of FOVs of the individual waveguides. When the FOVs overlap, the range of continuous FOV include, e.g., can be a sum of, non-overlapping portions of the FOVs of individual waveguides. For example, if a first waveguide having a first diffraction grating formed thereon has $\alpha_1$ from −5 to 20 degrees (i.e., $\Delta\alpha_1$=25 degrees) for light with a given color, and a second waveguide having a second diffraction grating formed thereon has $\alpha_2$ from −20 to 5 degrees (i.e., $\Delta\alpha_2$=25 degrees) for the given color, the complementary FOV for the given color from the stack is 40 degrees.

Display devices according to various embodiments include a plurality of waveguides formed over one another and having formed thereon respective diffraction gratings, wherein the diffraction gratings are configured to diffract visible light incident thereon into respective waveguides, such that visible light diffracted into the respective waveguides propagates within each of the respective waveguides to be guided therein by total internal reflection. The diffraction gratings are configured to diffract the visible light into the respective waveguides within different FOVs, with respect to a layer normal direction of the waveguide, where the respective FOVs are such that the waveguides have a combined FOV that is continuous and greater than each of the individual respective FOVs.

Figure 11:
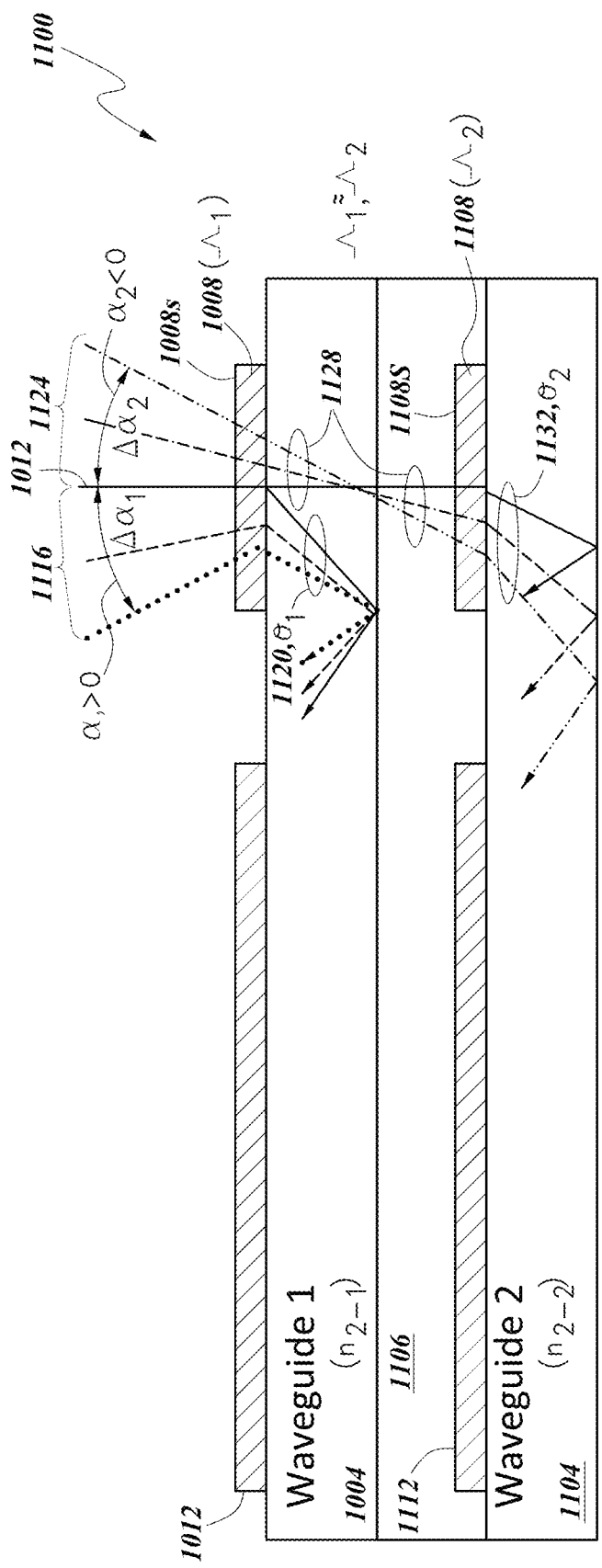
FIG. 11 illustrates a cross-sectional view of a display device comprising stacked waveguides having disposed thereon respective diffraction gratings, where the stack has an aggregate acceptance angle or field of view (FOV), $\Delta\alpha_{tot}$, greater than the acceptance angles or field of views (FOVs), $\Delta\alpha_1$ and $\Delta\alpha_2$, of the respective component waveguides, according to some embodiments.

FIG. 11 illustrates a cross-sectional view of a portion of a display device 1100 comprising stacked waveguides configured for increased combined effective field of view (FOV) for light having a color in the visible wavelength range, according to embodiments. The display device 100 comprises stacked waveguides 1004, 1104 having formed thereon respective diffraction gratings 1008, 1108, where the stack has a combined effective field of view (FOV) greater than respective FOVs $\Delta\alpha_1$, $\Delta\alpha_2$, of the component waveguides 1004, 1104. The display device 1100 includes a first waveguide 1004 and a second waveguide 1104 formed over one another. The first waveguide 1004 has formed thereon a first diffraction grating 1008, and the second waveguide 1104 has formed thereon a second diffraction grating 1108. The first and second diffraction gratings 1008, 1108 are configured to diffract visible light 1116, 1124, respectively, that is incident thereon into respective waveguides 1004, 1104, such that the visible light diffracted into the respective waveguides 1004, 1104 propagates within each of the respective waveguides. The first and second diffraction gratings 1008, 1108 are configured to diffract the visible light that is incident thereon within the different respective field of views, $\Delta\alpha_1$, $\Delta\alpha_2$, into the respective waveguides 1004, 1104, with respect to a layer normal 1012, e.g., the y-z plane or the z-direction. The display device 1100 additionally includes optical elements 1012 and 1112 formed on waveguides 1004 and 1104, respectively.

In the illustrated embodiment, the first and second waveguides 1004, 1104 are in a stacked arrangement and interposed by a separator 1106, and have substantially parallel directions of propagation (e.g., x-direction) under total internal reflection.

The first and second waveguides 1004, 1104 and the corresponding first and second diffraction gratings 1008, 1012 are similar to each other except, the first and second diffraction gratings 1004, 1108 have different periods $\Lambda_1$, $\Lambda_2$, respectively and are configured to diffract light having different wavelength while having the same general color (i.e., red, green, or blue). However, embodiments are not so limited, and the first and second diffraction gratings 1004, 1108 can have substantially the same period and be configured to diffract light having the same wavelength.

Additionally, the first waveguide 1004 coupled to the first diffraction grating 1008 is configured to diffract light having a first, e.g., a positive α (having a counterclockwise angle with respect to the plane normal 1012), whereas the second waveguide 1104 coupled to the second diffraction grating 1108 is configured to diffract light having a different, e.g., a negative α (having a clockwise angle with respect to the plane normal 1012). However, embodiments are not so limited. For example, the first and second waveguides 1004 and 1104 can both be configured to diffract positive or negative but different angles of incidence. Other variations are possible. For example, either of the first and second waveguides 1004 and 1104 can be configured to diffract positive or negative angles or both, and the ranges of angles $\Delta\alpha_1$ and $\Delta\alpha_2$ can be the same or different in magnitude.

The first diffraction grating 1008 is configured to partially diffract and to partially transmit visible light 1116, 1124 incident thereon, respectively. In the illustrated embodiment, the first diffraction grating 1008 is configured to partially diffract the visible light 1116 incident thereon within the first FOV ($\Delta\alpha_1$), and to partially transmit therethrough the visible light 1124 incident thereon within the second FOV ($\Delta\alpha_2$). The second diffraction grating 1108 is configured to receive light 1128 partially transmitted through the first diffraction grating 1008 as an incident light, and to at least partially diffract the light 1128 into partially diffracted light 1132.

In the illustrated embodiment, the first and second diffraction gratings 1008 and 1108 are configured to diffract light having the same color. That is, each of the first and second diffraction gratings 1008 and 1108 is configured to diffract light having one or more wavelengths in the same color range (red, green, or blue color range) within the wavelength range of about 435 nm-780 nm. In various embodiments, the first and second diffraction gratings 1008 and 1108 can be configured to diffract light having the same or different wavelengths within in the range of about 620-780 nm for red color, to diffract light having the same or different wavelengths within in the range of about 492-577 nm for green color, or to diffract light having the same or different wavelengths within in the range of about range of about 435-493 nm for blue color.

In some embodiments, the first and second diffraction gratings 1008 and 1108 may be configured to diffract particular wavelengths by configuring the respective periods $\Lambda_1$, $\Lambda_2$. Without being bound to any theory, under some circumstances, the period Λ may be generally related to α, $n_2$, θ and λ by the following equation:

$$\Lambda_a(\sin \alpha + n_2 \sin \theta) = m\lambda,\quad [1]$$

where m is an integer (e.g., 1, 2, 3 . . . ) and α, $n_2$, θ, and λ are angle of incidence, refractive index of the waveguide, angle of the diffracted light and the wavelength of the light, respectively, and may have values described elsewhere in the specification. Other types of diffractive optical element and possible holographic optical element can be used.

Still referring to FIG. 11, in the illustrated embodiment, to configure each of the first and second diffraction gratings 1008 and 1108 to diffract light having one or more wavelengths in the same color range (red, green, or blue color range), each of the $\Lambda_1$ and $\Lambda_2$ may be selected to be smaller than wavelength(s) the gratings 1008 and 1108 are configured to diffract. Thus, where each of the first and second diffraction gratings 1008 and 1108 is configured to diffract at least red light, each of the $\Lambda_1$ and $\Lambda_2$ may selected to be less than a wavelength (or any wavelength) in the range of about 620-780 nm; where each of the first and second diffraction gratings 1008 and 1108 is configured to diffract at least green light, each of the $\Lambda_1$ and $\Lambda_2$ may selected to be less than a wavelength (or any wavelength) in the range of about 492-577 nm; where each of first and second diffraction gratings 1008 and 1108 is configured to diffract at least blue light, each of the $\Lambda_1$ and $\Lambda_2$ may selected to be less than a wavelength (or any wavelength) in the range of about 435-493 nm. In various embodiments, the $\Lambda_1$ and $\Lambda_2$ may be between about 40% and about 99%, between about 50% and about 90%, or between about 60% and about 80%, for instance about 71% of any of the wavelengths the respective diffraction gratings are configured to diffract. For example, where a waveguide is configured to diffract light having a wavelength of 530 nm (green color), the diffraction grating may have a period of 380 nm, and where a waveguide is configured to diffract light having a wavelength of 650 nm (red color), the diffraction grating may have a period of 465 nm.

Still referring to the illustrated embodiment of FIG. 11, the combination of the first grating 1008 and the first waveguide 1004 is configured to diffract light within a first FOV ($\Delta\alpha_1$) that is different from a second FOV ($\Delta\alpha_2$) the combination of the second grating 1108 and the second waveguide 1104 is configured to diffract within. In some embodiments, the different FOVs $\Delta\alpha_1$ and $\Delta\alpha_2$ can be obtained by configuring the respective indices of refraction $n_2$ of the first and second waveguides 1004 and 1104 to have different values that can be 1.5, 1.6, 1.7, 1.8, 1.9, or a value in a range defined by any of these values, or higher but less than $n_1$.

Still referring to FIG. 11, in operation, when incident light 1116 e.g., visible light, is incident on the first diffraction grating 1008 having the first period $\Lambda_1$ at an angle of incidence $\alpha_1$, the first diffraction grating 1008 at least partially diffracts the incident light 1116 as a diffracted light 1120 at a first diffraction angle $\theta_1$. The first waveguide 1004 has a first waveguide index of refraction $n_{2-1}$ such that when the incident light 1116 incident on the surface 1008S is incident within the $\Delta\alpha_1$, the first wave guide 1004 diffracts the incident light 1116 at a first diffraction angle $\theta_1$ that exceeds a critical angle $\theta_{TIR-1}$ for occurrence of total internal reflection in the waveguide 1004. The resulting diffracted light 1120 propagates along the x-axis under total internal reflection (TIR) until the light reaches the optical element 1012 and exit therethrough.

The first diffraction grating 1008 at least partially transmits the incident light 1124 as transmitted light 1128, which in turn becomes incident light on the second diffraction grating 1108 having the second period $\Lambda_2$ at an angle of incidence $\alpha_2$. The second diffraction grating 1108 in turn at least partially diffracts the light 1128 as diffracted light 1132 at a second diffraction angle $\theta_2$. The second waveguide 1104 has a second waveguide index of refraction $n_{2-2}$ such that when the light 1128 is incident on the surface 1108S within the $\Delta\alpha_2$, the second wave guide 1104 diffracts the light 1128 at a diffraction angle that exceeds a critical angle $\theta_{TIR-2}$ for occurrence of total internal reflection in the waveguide 1104. The resulting diffracted light 1132 propagates along the x-axis under total internal reflection (TIR) until the light reaches the optical element 1112.

Thus, while the first waveguide 1004 having formed thereon the first diffraction grating 1008 and the second waveguide 1104 having formed thereon the first diffraction grating 1108 individually have $\Delta\alpha_1$ and $\Delta\alpha_2$, respectively, when stacked as illustrated in the portion of the display device 1100, the resulting stacked waveguides 1004, 1104 have a combined FOV that is continuous and greater than respective FOVs $\Delta\alpha_1$, $\Delta\alpha_2$, of the component waveguides 1004, 1104.

In the illustrated embodiment, the diffraction gratings 1008 and 1108 have suitable lengths in the x-direction and partially or fully overlap each other in the x-direction, such that the overlapping portion is sufficient for the incident light 1124 within $\Delta\alpha_2$ to traverse both the first and second diffraction gratings 1008 and 1108.

In the illustrated embodiment, to have the combined FOV with high diffraction efficiency, it will be appreciated that the first diffraction grating 1008 is configured to diffract the incident light 1116 within the $\Delta\alpha_1$ with high diffraction efficiency, while being configured to at least partially transmit the incident light 1124, and the second diffraction grating 1108 is configured to diffract its incident light 1128 within the $\Delta\alpha_2$ with high diffraction efficiency. According to embodiments, the first and second diffraction gratings 1008 and 1108 are configured to diffract incident light 1116 and 1124 within $\Delta\alpha_1$ and $\Delta\alpha_2$, respectively, with diffraction efficiency exceeding about 20%, 40%, 60% or 80%, or having a percentage in any range defined by any of these values, according to embodiments. According to embodiments, the first diffraction grating 1008 is configured to transmit the incident light 1124 within the $\Delta\alpha_2$ with transmission efficiency exceeding about 20%, 40%, 60% or 80% or having a percentage in any range defined by any of these values, according to embodiments.

In some embodiments, $\Delta\alpha_1$ and $\Delta\alpha_2$ may partially overlap. According to embodiments, $\Delta\alpha_1$ and $\Delta\alpha_2$ overlap by less than 20%, 40%, 60% or 80% or a percentage in any range defined by any of these values, on the basis of $\Delta\alpha_1$ or $\Delta\alpha_2$, or by less than 5°, 10°, 15°, or 20° or a value in any range defined by any of these values, according to embodiments.

In one example, the first waveguide 1004 is configured to couple light having $\alpha_1$ from 0 to 30 degrees (i.e., $\Delta\alpha_1$=30 degrees) and a green wavelength (e.g., 530 nm) into the first waveguide 1004, while the second waveguide 1104 is configured to couple light having the same green wavelength and $\alpha_2$ from −30 to 0 degrees (i.e., $\Delta\alpha_2$=30 degrees). The resulting combined FOV can be as high as 60 degrees.

Still referring to FIG. 11, while only two waveguides are stacked in the illustrated embodiment, embodiments are not so limited. In other embodiments, additional waveguides may further be stacked to provide still larger combined FOVs. For example, a combination of a third waveguide and a third diffraction grating may be formed under the second waveguide 1104 and configured such that visible light having the same color and the same or different wavelength as the incident light 1116, 1124 incident on the first diffraction grating 1008 within a third FOV $\Delta\alpha_3$ may be partially transmitted through the first and second diffraction gratings 1008, 1108, to be diffracted the third diffraction grating.

Figure 12A:
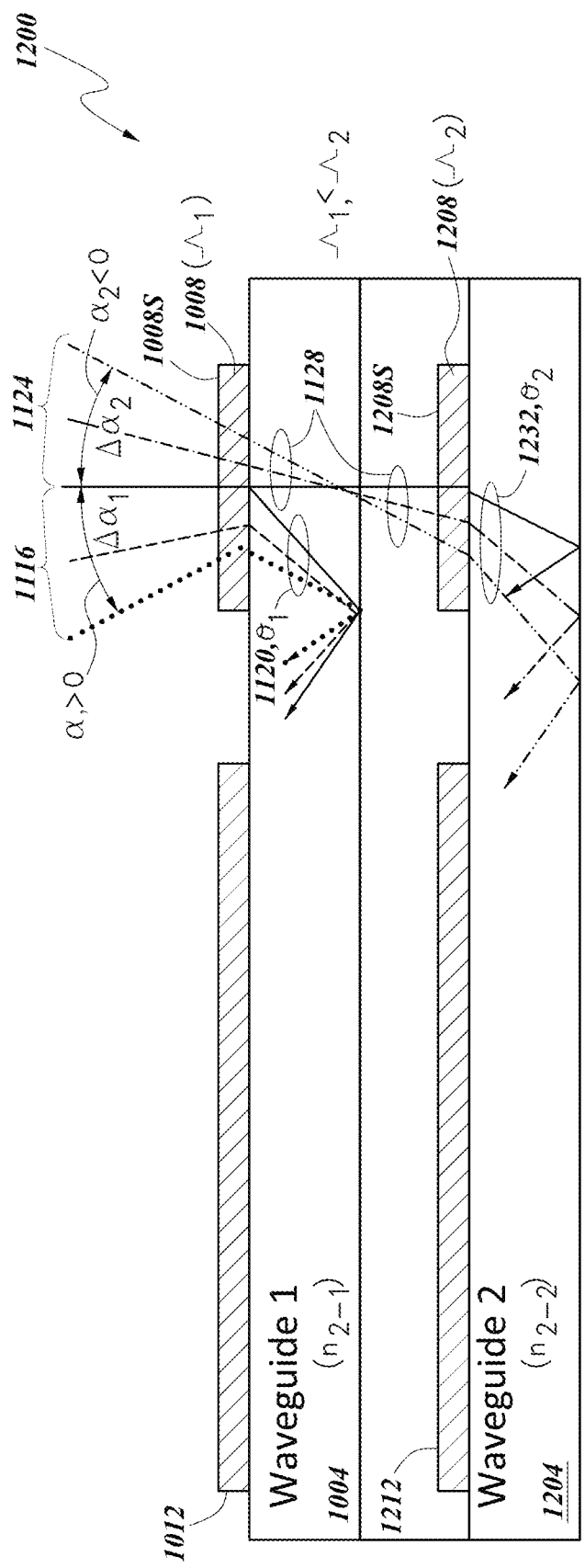
FIGS. 12A and 12B illustrate cross-sectional views of a display device comprising stacked waveguides having formed thereon respective diffraction gratings with different periods, where the stack has a an aggregate acceptance angle or combined effective field of view (FOV) greater than field of views (FOVs) of the component waveguides, according to some embodiments. In addition, the second waveguide operated on two wavelengths (e.g., two colors) providing for a more compact design by potentially reducing the number of waveguides needed in some cases.
Figure 12B:
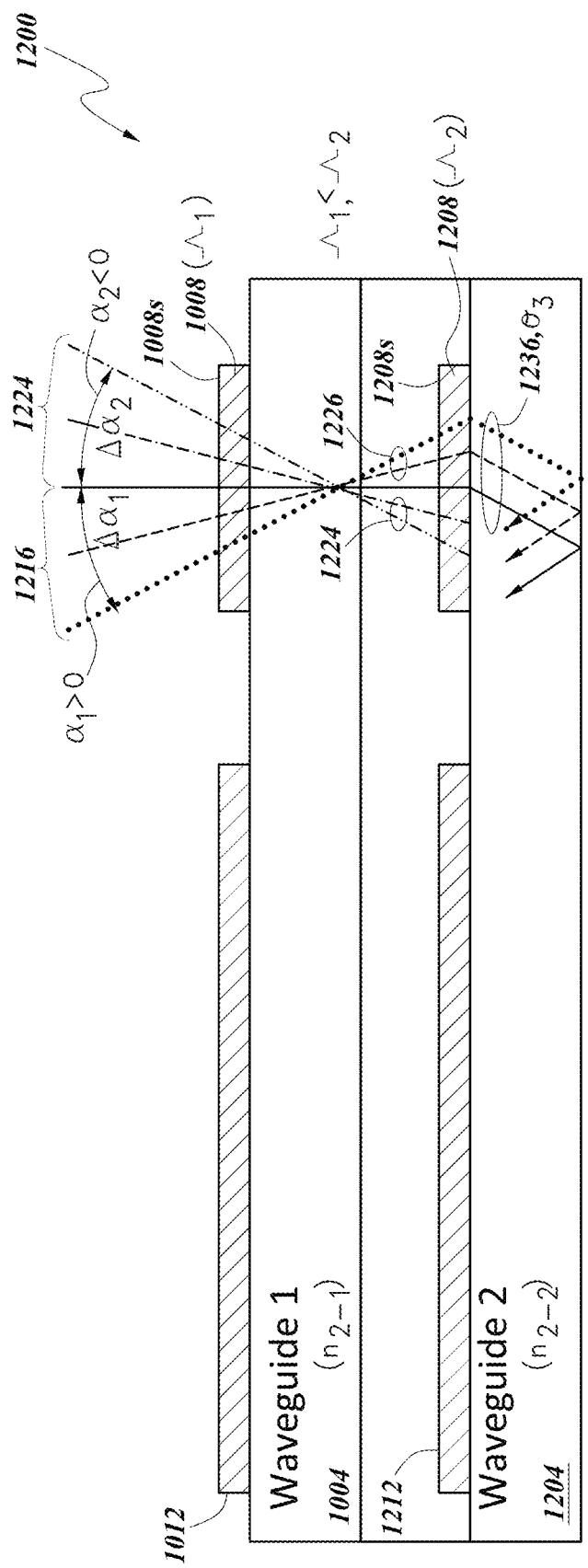

FIGS. 12A and 12B illustrate cross-sectional views of portions of a display device 1200 comprising stacked waveguides configured for increased combined effective field of view (FOV) for light having multiple colors in the visible wavelength range, according to embodiments. FIGS. 12A and 12B illustrate cross-sectional views of portions of a display device 1200 comprising stacked waveguides 1004, 1204 having formed thereon respective diffraction gratings 1008, 1208, where the stack has a combined field of view (FOV) greater than respective field of views (FOVs) of the component waveguides 1004, 1204, according to some embodiments. Similar to the display device 1100 illustrated above with respect to FIG. 11, the display device 1200 includes a first wave guide 1004 and a second waveguide 1204 formed over one another. The first waveguide 1004 has formed thereon a first diffraction grating 1008, and the second waveguide 1204 has formed thereon a second diffraction grating 1208. The display device 1200 additionally includes optical elements 1012 and 1212 formed on waveguides 1004 and 1204, respectively. Other arrangements of the display device 1200 that are the same or similar to the display device 1100 illustrated above with respect to FIG. 11 are omitted herein.

However, unlike the display device 1100 illustrated above with respect to FIG. 11, the first and second diffraction gratings 1008, 1208 have different periods $\Lambda_1$, $\Lambda_2$, respectively and are configured to diffract light having different colors (i.e., red, green, or blue).

Referring to FIG. 12A, the first and second diffraction gratings 1008, 1208 are configured to diffract visible light 1116, 1124, respectively, each having a first color and a first wavelength $\lambda_1$ incident thereon into respective waveguides 1004, 1204, respectively, such that the visible light having the first color and the $\lambda_1$ is diffracted into the respective waveguides 1004, 1204 and propagates within the respective waveguides. The first and second diffraction gratings 1008, 1208 are configured to diffract the visible light having the first color incident thereon within different field of views $\Delta\alpha_1$, $\Delta\alpha_2$, respectively, with respect to the plane normal 1012, e.g., the z-direction, into the respective waveguides 1004, 1204.

Referring to FIG. 12B, the first diffraction grating 1008 is configured to substantially transmit visible light 1216, 1214 having a second color and a second wavelength $\lambda_2$. The transmitted visible light 1226 having the second color and wavelength $\lambda_2$ now incident on the second diffraction grating 1208 is at least partially diffracted into the second waveguide 1204, and propagated in the x-direction. The second diffraction grating 1208 is configured to diffract the visible light 1216, 1214 having the second color and incident on the first diffraction grating 1008 within one or both of the field of views $\Delta\alpha_1$, $\Delta\alpha_2$ into the second waveguide 1204. In the illustrated embodiment, the visible light 1216 is diffracted as being diffracted into the second waveguide 1204.

In summary, referring to FIG. 12A, the first waveguide 1004 and the first diffraction grating 1008 are configured to diffract visible light having the first color and $\lambda_1$ and having a positive $\alpha_1$ (within $\Delta\alpha_1$), whereas the second waveguide 1204 and second diffraction grating 1208 are configured to diffract visible light having the first color and $\lambda_1$ and having a negative $\alpha_2$ (within $\Delta\alpha_2$).

In summary, referring to FIG. 12B, the first waveguide 1004 and the first diffraction grating 1008 are configured to substantially transmit visible light 1216, 1214 having the second color and $\lambda_2$ and having a positive $\alpha_1$ (within $\Delta\alpha_1$)

and negative $\alpha_2$ (within $\Delta\alpha_2$), respectively, whereas the second waveguide 1204 and second diffraction grating 1208 are configured to at least partially diffract visible light having the second color and $\lambda_2$ and having at least one of the positive $\alpha_1$ (within $\Delta\alpha_1$) and the negative $\alpha_2$ (within $\Delta\alpha_2$). In some embodiments, the different FOVs $\Delta\alpha_1$ and $\Delta\alpha_2$ can be obtained by configuring the respective indices of refraction $n_{2\text{-}1}$ and $n_{2\text{-}1}$ of the first and second waveguides 1004 and 1204 to have different values that can be 1.5, 1.6, 1.7, 1.8, 1.9, or higher or a value in a range defined by any of these values but less than $n_1$ of the diffraction gratings 1004, 1208.

Unlike the embodiment illustrated with respect to FIG. 11, in the illustrated embodiment of FIGS. 12A and 12B, the first and second diffraction gratings 1008 and 1208 are configured to diffract light having one or more wavelengths corresponding to different colors (red, green, or blue color range) within wavelengths in the range of about 435 nm-780 nm. For example, the first and second diffraction gratings 1008 and 1208 are configured to diffract light having different wavelengths within different ranges of about 620-780 nm for red color, about 492-577 nm for green color, or about 435-493 nm for blue color. In particular, in the illustrated embodiment, the first diffraction grating 1008 is configured to diffract a green light, and second diffraction grating 1208 is configured to diffract a green light and a red light.

In the illustrated embodiment, to configure each of the first and second diffraction gratings 1008 and 1208 to diffract light having one or more wavelengths corresponding to different colors (red, green, or blue), the respective $\Lambda_1$ and $\Lambda_2$ may be selected to be different and smaller than the wavelengths the gratings 1008 and 1208 are configured to diffract. Thus, where the first and second diffraction gratings 1008 and 1208 are configured to diffract a green light and a red light, respectively, the $\Lambda_1$ and $\Lambda_2$ may be selected to be less than a wavelength (or any wavelength) within different ranges of about 492-577 nm for green color and about 620-780 nm for red color, respectively. In addition, where the first and second diffraction gratings 1008 and 1208 are configured to diffract a blue light and a green light, respectively, the $\Lambda_1$ and $\Lambda_2$ may be selected to be less than a wavelength (or any wavelength) within different ranges of about 435-493 nm for blue color and about light 492-577 nm for green color, respectively.

Referring to FIG. 12A, in operation, when incident light 1116, e.g., visible light having a first color and $\lambda_1$, is incident on the first diffraction grating 1008 having the first period $\Lambda_1$ at an angle of incidence $\alpha_1$, the first diffraction grating 1008 at least partially diffracts the incident light 1116 as a diffracted light beam 1120 at a first diffraction angle $\theta_1$. The first waveguide 1004 has a first waveguide index of refraction $n_{2\text{-}1}$ such that when the incident light 1116 is incident on the surface 1008S within $\Delta\alpha_1$, the first diffraction grating 1008 diffracts the incident light 1116 at a diffraction angle that exceeds a critical angle $\theta_{TIR\text{-}1}$ for occurrence of total internal reflection (TIR) in the waveguide 1004. The resulting diffracted light 1120 propagates in along the x-axis under TIR until the light reaches the optical element 1012 and exits therethrough.

The first diffraction grating 1016 at least partially transmits the incident light 1124 incident thereon at an angle of incidence $\alpha_2$ and having the first color and $\lambda_1$ as a transmitted light 1128, which in turn becomes light 1128 incident on the second diffraction grating 1208 having the second period $\Lambda_2$. The second diffraction grating 1208 at least partially diffracts the light 1128 incident within the $\Delta\alpha_2$ as diffracted light 1232 at a second diffraction angle $\theta_2$. The second waveguide 1204 has a second waveguide index of refraction $n_{2\text{-}2}$ such that when the light 1128 is incident within the $\Delta\alpha_2$, the second wave guide 1204 diffracts the light 1128 at a diffraction angle that exceeds a critical angle $\theta_{TIR\text{-}2}$ for occurrence of total internal reflection in the waveguide 1204. The resulting diffracted light 1232 propagates in along the x-axis under total internal reflection (TIR) until the light reaches the optical element 1212 and exits therethrough.

Referring to FIG. 12B, when incident light 1216 and 1214, e.g., visible light having a second color and $\lambda_2$, is incident on the first diffraction grating 1008 at $\alpha_1$ and within $\Delta\alpha_1$ and at $\alpha_2$ within $\Delta\alpha_2$, respectively, the first diffraction grating 1008 substantially transmits the incident light 1216 and 1214 into corresponding substantially transmitted light 1226 and 1224, respectively. The transmitted light 1226 and 1224 in turn becomes incident on the second diffraction grating 1208 at $\alpha_1$ and within $\Delta\alpha_1$ and $\alpha_2$ within $\Delta\alpha_2$, respectively. The second waveguide 1204 has a second waveguide index of refraction $n_{2\text{-}2}$ such that when the light 1216 is incident on the surface 1208S within the $\Delta\alpha_1$, the diffraction grating 1208 diffracts the light 1226 at a diffraction angle that exceeds a critical angle $\theta_{TIR\text{-}2}$ for occurrence of total internal reflection in the second waveguide 1204, such that the diffracted light 1236 propagates in along the x-axis under total internal reflection (TIR) until the light reaches the optical element 1212 and exits therethrough.

Thus, by stacking the first waveguide 1004 having formed thereon the first diffraction grating 1008 having the first period $\Lambda_1$, and the second waveguide 1204 having formed thereon the second diffraction grating 1208 having the second period $\Lambda_2$, the first diffraction grating 1008 is configured to diffract light having the first color and $\lambda_1$ and within $\Delta\alpha_1$, the second diffraction grating 1208 is configured to diffract light having the first color and $\lambda_1$ and within $\Delta\alpha_2$, and the second diffraction grating 1208 is further configured is configured to diffract light having the second color and $\lambda_2$ and within at least $\Delta\alpha_1$. The resulting stack has a combined FOV greater than respective field of views (FOVs) $\Delta\alpha_1$, $\Delta\alpha_2$ of the component waveguides 1004, 1204. Also, the second waveguide propagate more than one color potentially reducing the number of waveguides in the stack.

In the illustrated embodiment, referring to FIG. 12A, to have the combined FOV with high diffraction efficiency, it will be appreciated that the first diffraction grating 1008 is configured to diffract the incident light 1116 having the first color within $\Delta\alpha_1$ with high diffraction efficiency, while being configured to at least partially transmit the incident light 1124 having the first color within $\Delta\alpha_2$. In addition, referring to FIG. 12B, the first diffraction grating 1008 is configured to substantially transmit incident light 1216, 1214 having the second color within $\Delta\alpha_1$ and $\Delta\alpha_2$, respectively. In addition, the second diffraction grating 1208 is configured to diffract with high diffraction efficiency its incident light 1128 having the first color within $\Delta\alpha_2$ and 1226 having the second color within at least the $\Delta\alpha_2$. According to embodiments, when configured to diffract light with high efficiency, the first and/or second diffraction gratings 1008 and/or 1208 are configured to diffract incident light within $\Delta\alpha_1$ or $\Delta\alpha_2$ with diffraction efficiency exceeding about 20%, 40%, 60% or 80%, or having a percentage within any range defined by any of these values, according to embodiments. According to embodiments, when configured to substantially transmit light, the first diffraction grating 1008 is configured to transmit incident light within $\Delta\alpha_1$ or $\Delta\alpha_2$ with transmission efficiency exceeding about 20%, 40%, 60% or 80%, or having a percentage within any range defined by any of these values, according to embodiments.

Still referring to FIGS. 12A and 12B, in some embodiments, the second color corresponds to a color having longer wavelength compared to the first color. For example, when the second color is red, the first color can be green (or blue), and when the second color is green, the first can be blue. Such arrangement allows for the transmissivity of the first diffraction grating 1008 discussed above. However, embodiments are not so limited and in some other embodiments, the second color can correspond to a color having shorter wavelength compared to the first color.

In some embodiments, $\Delta\alpha_1$ and $\Delta\alpha_2$ may partially overlap. According to embodiments, $\Delta\alpha_1$ and $\Delta\alpha_2$ overlap by less than 20%, 40%, 60% or 80%, or by a percentage within any range defined by any of these values, on the basis of $\Delta\alpha_1$ or $\Delta\alpha_2$, or by less than 5°, 10°, 15°, or 20°, or by a value in a range defined by any of these values, according to embodiments.

In one example, the first waveguide 1004 can be configured with the first diffraction grating 1008 having $\Lambda_1$=380 nm to couple a green light (e.g., 530 nm) having $\alpha_1$ from −5 to 20 degrees (i.e., $\Delta\alpha_1$=25 degrees) into the first waveguide 1004. The second waveguide 1204 can be configured with the second diffraction grating 1208 having $\Lambda_2$=465 nm to couple the green light (e.g., 530 nm) having $\alpha_2$ from −20 to 5 degrees (i.e., $\Delta\alpha_2$=25 degrees) into the second waveguide 1204. The resulting combined FOV is 40 degrees, which is a significant improvement over either $\Delta\alpha_1$=25 degrees or $\Delta\alpha_2$=25 degrees. In addition, second waveguide 1204 configured with the second diffraction grating 1208 having $\Lambda_2$=465 nm can couple red light (e.g., 650 nm) having $\alpha_1$ from −5 to 20 degrees (i.e., $\Delta\alpha_1$=25 degrees) into the second waveguide 1204. Thus, the stack can be used to project a green-color image (e.g., at 530 nm) having a combined FOV of 40 degrees, as well as a red-color image (e.g., at 650 nm) having an FOV of 25 degrees.

FIGS. 13A to 13C schematically illustrate the visual effect to the user of combining or stacking waveguides in a configuration similar to those illustrated above with respect to FIGS. 12A and 12B, in operation, according to embodiments. FIG. 13A illustrates a schematic perspective view of a display device 1200A comprising a waveguide configured similarly to a first waveguide (1012 in FIGS. 12A, 12B), FIG. 13B illustrates a schematic perspective view of a display device 1200B comprising a waveguide configured similarly to a second waveguide (1112 in FIG. 12A and 1212 in FIG. 12B), and FIG. 13C illustrates a schematic perspective view of a display device 1200 comprising stacked waveguides (1100 in FIG. 11, 1200 in FIG. 12) configured for increased combined effective field of view (FOV), according to embodiments. In operation, the component first (1012, FIG. 13A) and second (1212, FIG. 13B) waveguides are configured, as described above, to receive incoming image information for a given color contained in the incident light 1116 (FIG. 13A), 1124 (FIG. 13B) incident on the display device within respective FOVs $\Delta\alpha_1$ and $\Delta\alpha_2$. Referring to FIG. 13C, when the first and second waveguides 1012, 1212 are stacked, the incident light 1116, 1124 having the first color (e.g., green) and the $\lambda_1$ is in-coupled to waveguides 1004, 1204 by being diffracted by the respective diffraction gratings 1008, 1208, to be propagated under TIR within the respective waveguides 1004, 1204. The diffracted light 1120, 1232 subsequently impinges on the respective light distributing elements 1010, 1210. The light distributing elements 1010, 1210 deflect the light so that they propagate towards the out-coupling optical elements 1012, 1212, to be out-coupled as out-coupled light 1140, 1148, respectively. The visual effect of stacking the waveguides to the user is described below.

FIG. 13A illustrates a schematic view of the display device 1200A comprising only a first waveguide 1004 of the display device 1200 illustrated in FIGS. 12A and 12B, for illustrative purposes only, where the waveguide 1004 has formed thereon the first diffraction grating 1008 having a first period $\Lambda_1$, and the resulting image 1144. Because the waveguide 1004 is configured to in-couple the incident light 1116 within $\Delta\alpha_1$, while the incoming image information is additionally contained in the incident light 1124 within $\Delta\alpha_2$, the resulting image 1144 contains only part of the incoming information of the first color (e.g., green).

FIG. 13B illustrates a schematic view of the display device 1200B comprising only a second waveguide 1204 of the display device 1200 illustrated in FIGS. 12A and 12B, for illustrative purposes only, where the waveguide 1204 has formed thereon the second diffraction grating 1208 having a second period $\Lambda_2$, and the resulting image 1152. Because the waveguide 1204 is configured to incouple the incident light 1124 within $\Delta\alpha_2$, while the incoming image information is additionally contained in the incident light 1116 within $\Delta\alpha_1$, the resulting image 1144 contains only part of the incoming information of the first color (e.g., green).

FIG. 13C illustrates a schematic view of the display device 1200 comprising the stacked first and second waveguides 1004 and 1204 similar to that illustrated in FIGS. 12A and 12B, where the waveguide 1004 has formed thereon the first diffraction grating 1008 having a first period $\Lambda_1$, and where the waveguide 1204 has formed thereon the second diffraction grating 1208 having a second period $\Lambda_2$. Because the combination of first and second waveguides 1004, 1204 is configured to in-couple both the incident light 1116 having the first color within $\Delta\alpha_1$ as well as the incident light 1124 having the first color within $\Delta\alpha_2$, the resulting image 1160 contains the sum of information of the first color (e.g., green) from the first and second waveguides 1004 and 1204.

Figure 14A:
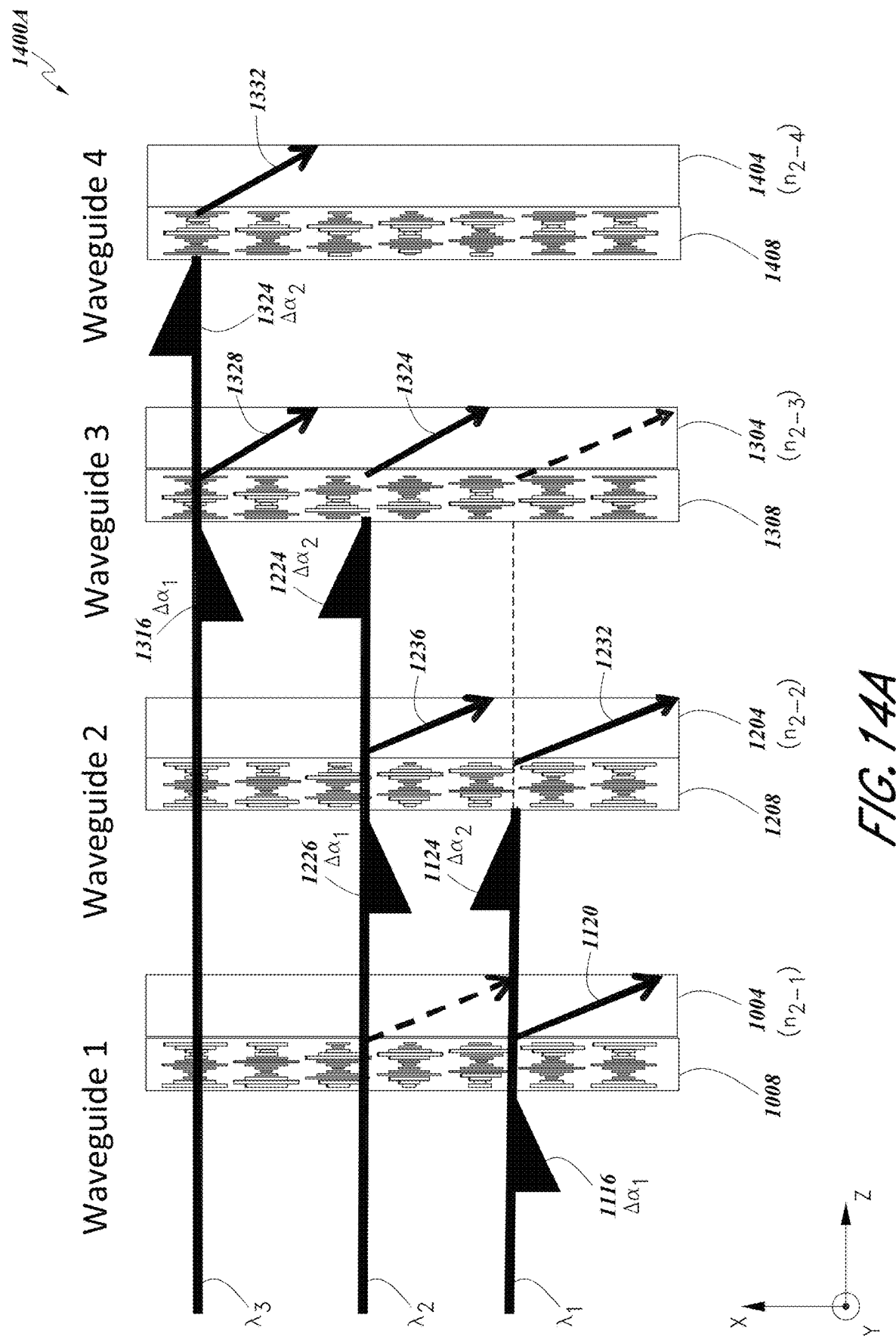
FIGS. 14A and 14B illustrate cross-sectional views of display devices comprising stacked waveguides having formed thereon respective diffraction gratings with different periods, where pairs of diffraction gratings provides a combined or an aggregate field of view (FOV) greater than field of views (FOVs) of the component waveguides, according to some embodiments. Additionally, some of the waveguides operate on multiple colors providing increase compactness by potentially reducing the number of waveguides.
Figure 14B:
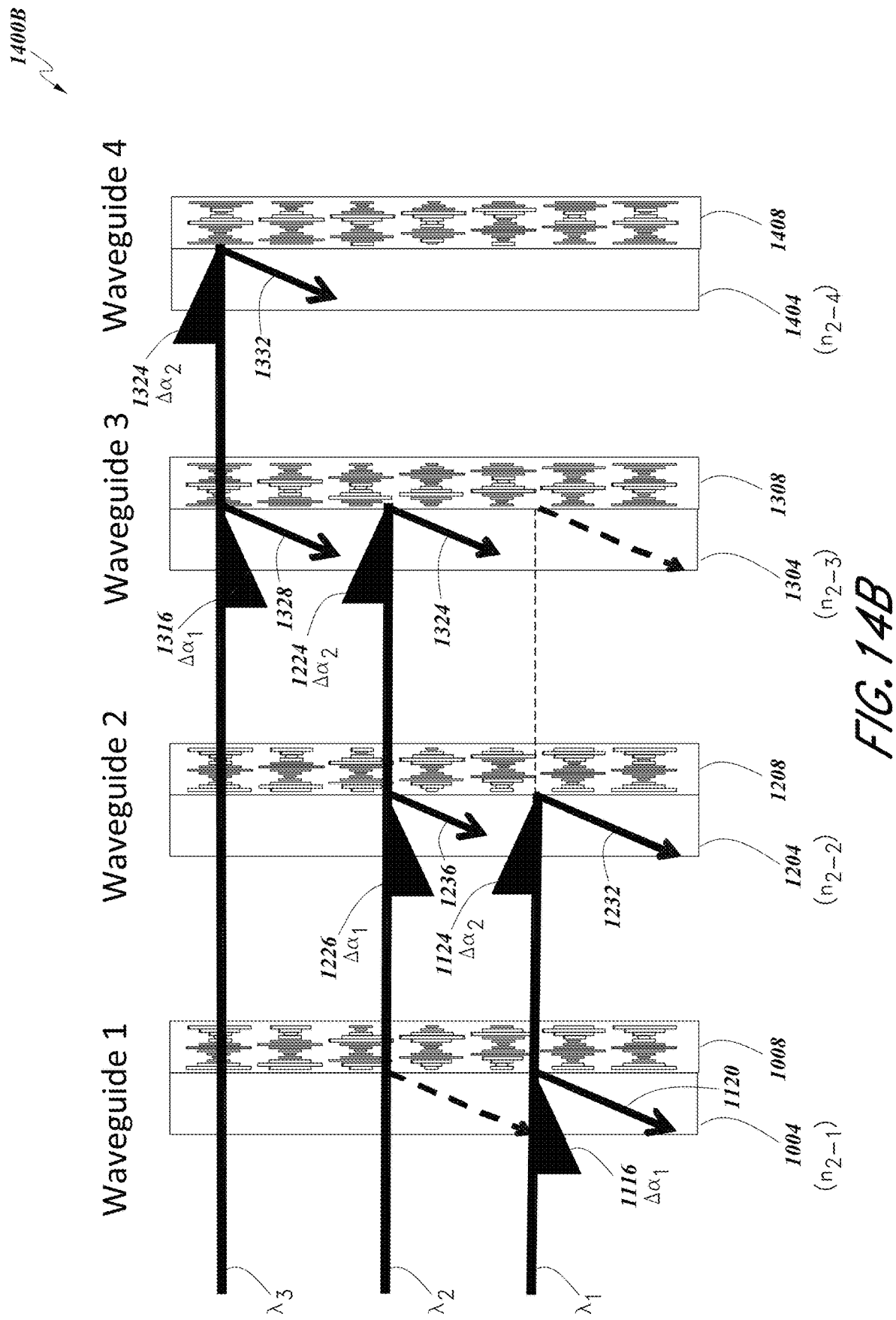

FIGS. 14A and 14B illustrate cross-sectional views of display devices 1400A and 1400B, respectively, each comprising a plurality of stacked waveguides 1004, 1204, 1304, 1404 having formed thereon respective diffraction gratings 1008, 1208, 1308, 1408, where the stacked waveguides are configured for increased combined effective field of view (FOV) for light having multiple colors in the visible wavelength range, according to embodiments. The stacked waveguides are configured to have a combined or aggregate field of view (FOV) greater than respective field of views (FOVs) of the component waveguides 1004, 1204, 1304, 1404, according to some embodiments. The display devices 1400A and 1400B are similar to each other except, the display device 1400A has diffraction gratings 1008, 1208, 1308, 1408 that face the incident light, whereas the display device 1400B has diffraction gratings 1008, 1208, 1308, 1408 that face away from the incident light. The operational principle of the display devices are similar between 1400A and 1400B, and will be described together herein.

Similar to the display device 1200 illustrated above with respect to FIGS. 12A and 12B, the display devices 1400A and 1400B include a first wave guide 1004 having disposed thereon a first diffraction grating 1008, a second waveguide 1204 having disposed thereon a second diffraction grating 1208, a third wave guide 1304 having disposed thereon a third diffraction grating 1308, and a fourth waveguide 1404 having disposed thereon a fourth diffraction grating 1408.

The first through fourth diffraction gratings 1008, 1208, 1308, 1408 have first through fourth periods $\Lambda_1, \Lambda_2, \Lambda_3, \Lambda_4$. Additional optical elements that are analogous to previous embodiments (e.g., 1012, FIGS. 12A, 12B) are omitted herein for clarity. Other analogous arrangements of the display devices 1400A and 1400B that are the same or similar to the display device 1200 illustrated above with respect to FIGS. 12A and 12B are omitted herein.

In operation, referring to coupling of light having $\lambda_1$, when incident light 1116, e.g., visible light each having a first color and $\lambda_1$, is incident on the first diffraction grating 1008 at an angle of incidence $\alpha_1$, the first diffraction grating 1008 at least partially diffracts the incident light 1116. In particular, the first waveguide 1004 has a first waveguide index of refraction $n_{2-1}$ such that when the incident light 1116 is incident on its surface within $\Delta\alpha_1$, the first waveguide 1004 diffracts the incident light 1116 at a diffraction angle that exceeds a critical angle $\theta_{TIR-1}$ for occurrence of total internal reflection in the waveguide 1004, such that the diffracted light 1120 propagates along the x-axis under total internal reflection (TIR).

The first diffraction grating 1008 at least partially transmits the incident light 1124 of the first color and $\lambda_1$ which in turn becomes incident on the second diffraction grating 1208 having the second period $\Lambda_2$ at an angle of incidence $\alpha_2$. The second diffraction grating 1208 at least partially diffracts the light 1224 of the first color and wavelength within the $\Delta\alpha_2$ as diffracted light 1232. In particular, the second waveguide 1204 has a second waveguide index of refraction $n_{2-2}$ such that when the light 1128 of the first color and wavelength is incident on the surface 1208S within the $\Delta\alpha_2$, the second waveguide 1204 diffracts the light 1124 at a diffraction angle that exceeds a critical angle $\theta_{TIR-2}$ for occurrence of total internal reflection in the waveguide 1204, such that the diffracted light 1232 propagates along the x-axis under total internal reflection (TIR).

Referring to coupling of light having $\lambda_2$, when incident light 1226 and 1224, e.g., visible light having a second color and $\lambda_2$, is incident on the first diffraction grating 1008, the first diffraction grating 1008 substantially transmits the incident light 1226 and 1224, which in turn becomes incident on the second diffraction grating 1208 at $\alpha_1$ within $\Delta\alpha_1$ and $\alpha_2$ within $\Delta\alpha_2$, respectively. The second waveguide 1204 has a second waveguide index of refraction $n_{2-2}$ such that when the light 1226 of the second color and wavelength is incident on its surface within $\Delta\alpha_1$, the second waveguide 1204 diffracts the light 1226 of the second color and wavelength at a diffraction angle that exceeds a critical angle $\theta_{TIR-2}$ for occurrence of total internal reflection in the second waveguide 1204, such that the diffracted light 1236 of the second color and wavelength propagates along the x-axis under total internal reflection (TIR). On the other hand, the second diffraction grating 1208 substantially transmits the light 1224 of the second color and wavelength, which in turn becomes incident on the third diffraction grating 1308 at $\alpha_2$ within $\Delta\alpha_2$. The third waveguide 1304 has a third waveguide index of refraction $n_{2-3}$ such that when the light 1224 of the second color and wavelength is incident on its surface within $\Delta\alpha_2$, the third waveguide 1304 diffracts the light 1224 of the second color and wavelength at a diffraction angle that exceeds a critical angle $\theta_{TIR-3}$ for occurrence of total internal reflection in the third waveguide 1304, such that the diffracted light 1324 of the second color and wavelength propagates along the x-axis under total internal reflection (TIR).

Referring to coupling of light having $\lambda_3$, when incident light 1316 and 1324, e.g., visible light having a third color and $\lambda_3$, is incident on the first and second diffraction gratings 1008, 1208, the first and second diffraction gratings 1008, 1208 substantially transmit the incident light 1316 and 1324, which in turn becomes incident on the third diffraction grating 1308 at $\alpha_1$ within $\Delta\alpha_1$ and $\alpha_2$ within $\Delta\alpha_2$, respectively. The third waveguide 1304 has a third waveguide index of refraction $n_{2-3}$ such that when the light 1316 is incident on its surface within the $\Delta\alpha_1$, the third waveguide 1304 diffracts the light 1316 at a diffraction angle that exceeds a critical angle $\theta_{TIR-3}$ for occurrence of total internal reflection in the third waveguide 1304, such that the diffracted light 1328 propagates along the x-axis under total internal reflection (TIR). On the other hand, the third diffraction grating 1308 substantially transmits the light 1324, which in turn becomes incident on the fourth diffraction grating 1408 at $\alpha_2$ within $\Delta\alpha_2$. The fourth waveguide 1404 has a fourth waveguide index of refraction $n_{2-4}$ such that when the light 1324 is incident on its surface within the $\Delta\alpha_2$, the fourth waveguide 1404 diffracts the light 1324 at a diffraction angle that exceeds a critical angle $\theta_{TIR-4}$ for occurrence of total internal reflection in the fourth waveguide 1404, such that the diffracted light 1332 propagates along the x-axis under total internal reflection (TIR).

Still referring to FIGS. 14A and 14B, in some embodiments, $\lambda_3$ corresponds to a color having longer wavelength compared to $\lambda_2$, and $\lambda_2$ corresponds to a color having longer wavelength compared to $\lambda_1$. For example, $\lambda_3$ corresponds to red, $\lambda_2$ corresponds to green, and $\lambda_1$ corresponds to blue. The first through fourth periods $\Lambda_1, \Lambda_2, \Lambda_3, \Lambda_4$ may have values that decrease in the direction of light propagation in some cases. For example, $\Lambda_1$ may have a suitable value corresponding to a diffraction grating configured to diffract blue light as described above, $\Lambda_2$ may have a suitable value corresponding to a diffraction grating configured to diffract, e.g., green (and blue) light as described above, and $\Lambda_3$ and $\Lambda_4$ may each have a suitable value corresponding to a diffraction grating configured to diffract red (and green) light as described above. However, embodiments are not so limited and in some other embodiments, $\Lambda_1, \Lambda_2, \Lambda_3, \Lambda_4$ may have values that increase in the direction of light propagation or that have random order.

Thus, by stacking the first through fourth waveguides 1004, 1204, 1304, 1404 having formed thereon respective diffraction gratings 1008, 1208, 1308, 1408 having respective periods $\Lambda_1, \Lambda_2, \Lambda_3, \Lambda_4$, the first waveguide 1004 is configured to diffract light having the first color and $\lambda_1$ and within $\Delta\alpha_1$, and the second waveguide 1204 is configured to diffract light having the first color and $\lambda_1$ and within $\Delta\alpha_2$, such that a combined FOV greater than respective field of views FOVs $\Delta\alpha_1$, $\Delta\alpha_2$ of the component first and second waveguides 1004, 1204, is achieved for light having the first color (e.g., blue) at $\lambda_1$. Similarly, the second waveguide 1204 is configured to diffract light having the second color and $\lambda_2$ and within $\Delta\alpha_1$ and the third waveguide 1304 is configured to diffract light having the second color and $\lambda_2$ and within $\Delta\alpha_2$, such that a combined FOV greater than respective field of views FOVs $\Delta\alpha_1$, $\Delta\alpha_2$ of the component second and third waveguides 1204, 1304 is achieved for light having the second color (e.g., green) at $\lambda_2$. Similarly, the third waveguide 1304 is configured to diffract light having the third color and $\lambda_2$ and within $\Delta\alpha_1$, and the fourth waveguide 1404 is configured to diffract light having the third color $\lambda_3$ and within $\Delta\alpha_2$, such that a combined FOV greater than respective field of views FOVs $\Delta\alpha_1$, $\Delta\alpha_2$ of the component third and fourth waveguides 1304, 1404 is achieved for light having the third color (e.g., red) at $\lambda_3$.

Notably, some waveguides operate on multiple colors and corresponding wavelengths. In some cases, less waveguide are therefore potentially used. The stack may thus be simpler and possibly smaller and lighter and less expensive or at least less complex.

Stacked Waveguides with Combined Field of View Based on Liquid Crystal-Based Diffraction Gratings As described supra, various embodiments include a plurality of waveguides formed over one another, e.g., in a stacked configuration, and having formed thereon respective diffraction gratings, where the respective diffraction gratings are configured to diffract visible light incident thereon into respective waveguides, such that visible light diffracted into the respective waveguides propagates within each of the respective waveguides. The respective diffraction gratings are configured to diffract the visible light into the respective waveguides within respective field of views (FOVs) with respect to a layer normal direction of the respective waveguide, wherein the respective FOVs are such that the waveguides have a combined FOV that is continuous and greater than each of the respective FOVs. In the following, embodiments of diffraction gratings based on liquid crystals and waveguides having the liquid-crystal diffraction gratings are described. The waveguides and the diffraction gratings are configured to achieve the particular arrangements described above, including wavelength selectivity of diffraction and transmission, as well as their FOV, for forming the stacked waveguides with combined FOVs.

Generally, liquid crystals possess physical properties that may be intermediate between conventional fluids and solids. While liquid crystals are fluid-like in some aspects, unlike most fluids, the arrangement of molecules within liquid crystals exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

Herein and throughout the disclosure, nematic liquid crystals are composed of rod-like molecules with the long axes of neighboring molecules approximately aligned to one another. To describe this anisotropic structure, a dimensionless unit vector n called the director, may be used to describe the direction of preferred orientation of the liquid crystal molecules.

Herein and throughout the disclosure, a tilt angle or a pre-tilt angle $\Phi$ can refer to an angle measured in a plane perpendicular to a major surface (in an x-y plane) of the liquid crystal layers or of the substrate, e.g., the x-z plane, and measured between an alignment direction and the major surface or a direction parallel to the major surface, e.g., the x-direction.

Herein and throughout the disclosure, an azimuthal angle or a rotation angle $\varphi$ is used to describe an angle of rotation about a layer normal direction, or an axis normal to a major surface of a liquid crystal layer, which is measured in a plane parallel to a major surface of the liquid crystal layers or of the substrate, e.g., the x-y plane, and measured between an alignment direction, e.g., an elongation direction or the direction of the director, and a direction parallel to the major surface, e.g., the y-direction.

Herein and throughout the disclosure, when an angle such as the rotation angle $\varphi$ or a pre-tilt angle $\Phi$ are referred to as being substantially the same between different regions, it will be understood that an average alignment angles can, for example, be within about 1%, about 5% or about 10% of each other although the average alignment can be larger in some cases.

Herein and throughout the specification, a duty cycle can, for example, refers to a ratio between a first lateral dimension of a first region having liquid crystal molecules aligned in a first alignment direction, and the grating period of the zone having the first region. Where applicable, the first region corresponds to the region in which the alignment of the liquid crystals does not vary between different zones.

As describe herein, liquid crystals in a nematic state or a smectic state can also exhibit chirality. Such liquid crystals are referred to as being in a chiral phase or a cholesteric phase. In a chiral phase or a cholesteric phase, the liquid crystals can exhibit a twisting of the molecules perpendicular to the director, with the molecular axis parallel to the director. The finite twist angle between adjacent molecules is due to their asymmetric packing, which results in longer-range chiral order.

As described herein, liquid crystals in a chiral smectic state or phase can be configured such that the liquid crystal molecules have positional ordering in a layered structure, with the molecules tilted by a finite angle with respect to the layer normal. In addition, chirality can induce successive azimuthal twists of the liquid crystal molecules with respect to a direction perpendicular to the layer normal from one liquid crystal molecule to the next liquid crystal molecule in the layer normal direction, thereby producing a spiral twisting of the molecular axis along the layer normal.

As described herein and throughout the disclosure, a chiral structure refers to a plurality of liquid crystal molecules in a cholesteric phase that extend in a direction, e.g., a direction perpendicular to the director such as a layer depth direction, and are successively rotated or twisted in a rotation direction, e.g., clockwise or counterclockwise. In one aspect, the directors of the liquid crystal molecules in a chiral structure can be characterized as a helix having a helical pitch.

As described herein, liquid crystals in a cholesteric phase displaying chirality can be described as having a chiral pitch, or a helical pitch (p), which corresponds to a length in the layer depth direction corresponding to a net rotation angle of the liquid crystal molecules of the chiral structures by one full rotation in the first rotation direction. In other words, the helical pitch refers to the distance over which the liquid crystal molecules undergo a full 360° twist. The helical pitch (p) can change, e.g., when the temperature is altered or when other molecules are added to a liquid crystal host (an achiral liquid host material can form a chiral phase if doped with a chiral material), allowing the helical pitch (p) of a given material to be tuned accordingly. In some liquid crystal systems, the helical pitch is of the same order as the wavelength of visible light. As described herein, liquid crystals displaying chirality can also be described as having a twist angle, or a rotation angle (φ), which can refer to, for example, the relative azimuthal angular rotation between successive liquid crystal molecules in the layer normal direction, and as having a net twist angle, or a net rotation angle, which can refer to, for example, the relative azimuthal angular rotation between an uppermost liquid crystal molecule and a lowermost liquid crystal molecule across a specified length, e.g., the length of a chiral structure or the thickness of the liquid crystal layer.

According to various embodiments described herein, liquid crystals having various states or phases as described above can be configured to offer various desirable material properties, including, e.g., birefringence, optical anisotropy, and manufacturability using thin-film processes. For example, by changing surface conditions of liquid crystal layers and/or mixing different liquid crystal materials, grating structures that exhibit spatially varying diffraction properties, e.g., gradient diffraction efficiencies, can be fabricated.

As described herein, "polymerizable liquid crystals" may refer to liquid crystal materials that can be polymerized, e.g., in-situ photopolymerized, and may also be described herein as reactive mesogens (RM).

It will be appreciated that the liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. For ease of description, the term "liquid crystal molecule" is used herein to refer to both the liquid crystal molecules before polymerization and to the liquid crystal domains formed by these molecules after polymerization.

According to particular embodiments described herein, photo-polymerizable liquid crystal materials can be configured to form Bragg-reflective structures, e.g., a diffraction grating, whose material properties, including birefringence, chirality, and ease for multiple-coating, can be utilized to create diffraction gratings with different material properties, e.g., birefringence, chirality, and thickness, which can result in different optical properties, e.g., diffraction efficiency, wavelength selectivity and off-axis diffraction angle selectivity, to name a few.

Optical properties of a grating are determined by the physical structures of the grating (e.g., the periodicity, the depth, and the duty cycle), as well as material properties of the grating (e.g., refractive index, absorption, and birefringence). When liquid crystals are used, optical properties of the grating can be controlled by controlling, e.g., molecular orientation or distribution of the liquid crystal materials. For example, by varying molecular orientation or distribution of the liquid crystal material across the grating area, the grating may exhibit graded diffraction efficiencies. Such approaches are described in the following, in reference to the figures.

In the following, various embodiments of cholesteric liquid crystal diffraction gratings (CLCGs) that are optimized for various optical properties are described. Generally, diffraction gratings have a periodic structure, which splits and diffracts light into several beams travelling in different directions. The directions of these beams depend, among other things, on the period of the periodic structure and the wavelength of the light. To optimize certain optical properties, e.g., diffraction efficiencies, for certain applications such as in-coupling optical elements (1008, 1208 in FIGS. 12A and 12B) or out-coupling optical elements (1012, 1212 in FIGS. 12A and 12B), various material properties of the CLC can be optimized as described infra.

As described supra, liquid crystal molecules of a cholesteric liquid crystal (CLC) layer in a chiral (nematic) phase or a cholesteric phase is characterized by a plurality of liquid crystal molecules that are arranged to have successive azimuthal twists of the director as a function of position in the film in a normal direction, or a depth direction, of the liquid crystal layer. As described herein, the liquid crystal molecules that arranged to have the successive azimuthal twists are collectively referred to herein as a chiral structure. As described herein, an angle (φ) of azimuthal twist or rotation is described as the angle between the directors the liquid crystal molecules, as described supra, relative to a direction parallel to the layer normal. The spatially varying director of the liquid crystal molecules of a chiral structure can be described as forming a helical pattern in which the helical pitch (p) is defined as the distance (e.g., in the layer normal direction of the liquid crystal layer) over which the director has rotated by 360°, as described above. As described herein, a CLC layer configured as a diffraction grating has a lateral dimension by which the molecular structures of the liquid crystals periodically repeat in a lateral direction normal to the depth direction. This periodicity in the lateral direction is referred to as a grating period (Λ).

According to various embodiments described herein, a diffraction grating comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. The arrangements of the liquid crystal molecules of the chiral structures vary periodically in a lateral direction perpendicular to the layer depth direction Without being bound to any theory, under a Bragg-reflection condition, the wavelength of the incident light (λ) may be proportional to the mean or average refractive index (n) of a CLC layer and to the helical pitch (p), and can be expressed as satisfying the following condition under some circumstances:

$$\lambda = np \qquad [2]$$

In addition, the bandwidth (Δλ) of Bragg-reflecting wavelengths may be proportional to the birefringence Δn (e.g., the difference in refractive index between different polarizations of light) of CLC layer and to the helical pitch (p), and can be expressed as satisfying the following condition under some circumstances:

$$\Delta\lambda = \Delta n \cdot p \qquad [3]$$

In various embodiments described herein, the bandwidth Δλ is about 60 nm, about 80 nm or about 100 nm.

According to various embodiments, a peak reflected intensity within a visible wavelength range between, e.g., about 390 nm and about 700 nm, or within a near infrared wavelength range between, e.g., about 700 nm and about 2500 nm, can exceed about 60%, about 70%, about 80% or about 90%. In addition, according to various embodiments, the full width at half maximum (FWHM) can be less than about 100 nm, less than about 70 nm, less than about 50 nm or less than about 20 nm.

Figure 15:
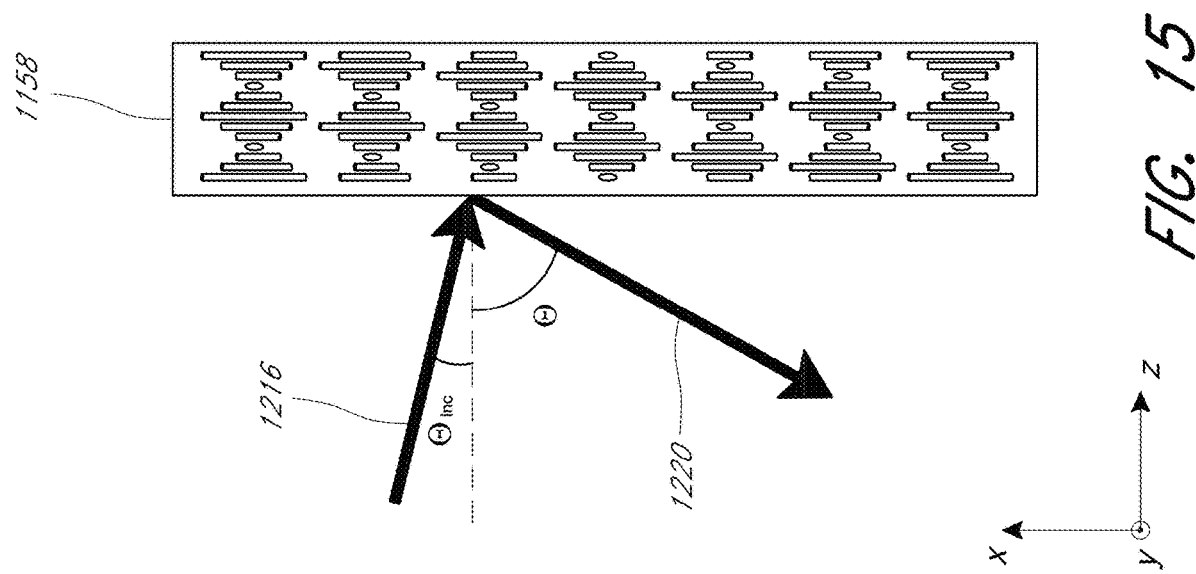
FIG. 15 illustrates a cross-sectional view of a cholesteric liquid crystal (CLC) layer configured as a diffraction grating for Bragg reflection at an off-axis incident angle.

FIG. 15 illustrates a cross-sectional side view of a CLC layer 1158 configured for high bandwidth of reflection at an off-axis incident angle, e.g., an off-axis angle $\alpha_1$ within $\Delta\alpha_1$ or $\alpha_2$ within $\Delta\alpha_2$ for light incident on the display device similar to that illustrated above with respect to FIGS. 12A and 12B, according to embodiments. As described herein, an off-axis incident angle refers an angle of incidence $\theta_{inc}$ of an incident beam 1216 with respect to the direction of layer normal (e.g., z-direction in FIG. 12) that has a non-zero value, resulting in a Bragg-reflected beam 1220 at a reflection angle θ. Under some circumstances, the reflection angle can be varied to a limited extent by varying a λ/Λ. Without being limited by any theory, under some circumstances, off-axis reflection can be described based on the following relationship:

$$n \cdot \sin(\theta) = \lambda/\Lambda + \sin(\theta_{inc}), \quad [4]$$

where $\theta_{inc}$ is the incident angle relative to the direction of layer normal, θ is the reflection angle relative to the direction of layer normal and n is a reflective index of a medium in which the reflected beam propagates. When the CLC layer 1158 is illuminated with the incident beam 1216 at an off-axis angle, the reflection spectrum may be shifted toward shorter wavelengths. According to various embodiments disclosed herein, the ratio λ/Λ can have a value between 0.5 and 0.8, between 0.6 and 0.9, between 0.7 and 1.0, between 0.8 and 1.1, between 0.9 and 1.2, between 1.0 and 1.6, between 1.1 and 1.5, or between 1.2 and 1.4.

Without being bound to any theory, the off-axis angle at which the CLC layer 1158 is configured to Bragg-reflect with high efficiency can also depend on the helical pitch p of the chiral structures.

Figure 16:
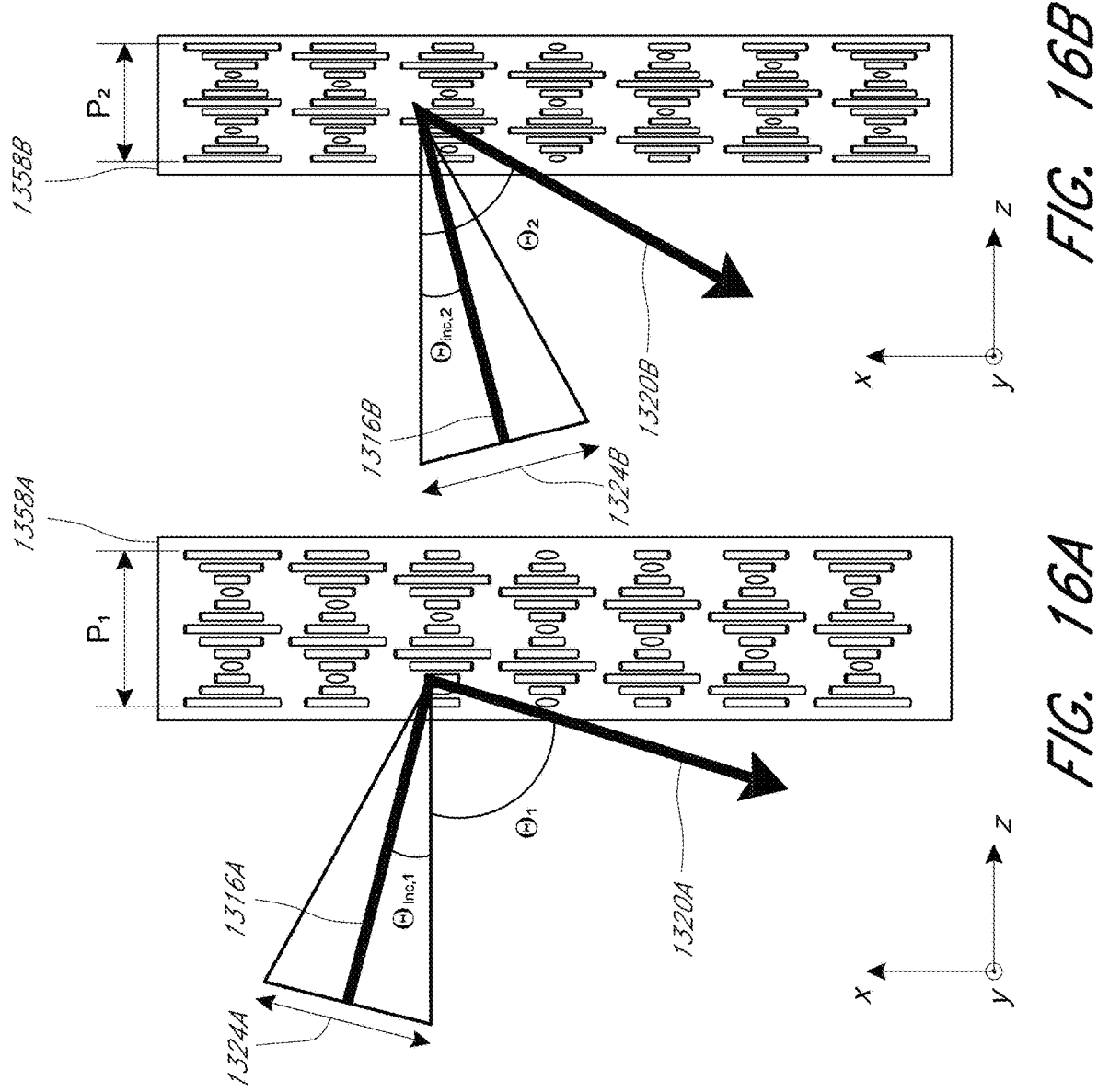
FIG. 16A illustrates a cross-sectional view of a CLC layer having a first helical pitch and configured as a diffraction grating for Bragg-reflection at a first off-axis incident angle.
FIG. 16B illustrates a cross-sectional view of a CLC layer having a second helical pitch and configured as a diffraction grating for Bragg-reflection at a second off-axis incident angle.

FIGS. 16A and 16B illustrate cross-sectional side views of CLC layers configured for reflection at off-axis incident angles, e.g., off-axis angles $\alpha_1$ within $\Delta\alpha_1$ or $\alpha_2$ within $\Delta\alpha_2$ for light incident on the display device similar to that illustrated above with respect to FIGS. 12A and 12B, according to embodiments. Referring to FIG. 16A, a first cholesteric liquid crystal (CLC) layer 1358A comprises a first plurality of chiral structures having a first helical pitch ($p_1$). The first CLC layer 1358A has a first helical pitch p1 such that Bragg-reflection is at a maximum when a first incident light beam 1316A is directed to an incident surface of the CLC layer 1358A at a first off-axis angle $\theta_{inc,1}$, which results in a first reflected light beam 1320A at a first reflection angle $\theta_1$. As illustrated, the CLC layer 1358A is further configured to have a first range 1324A of off-axis incident angles, which can correspond to $\Delta\alpha_1$ or $\Delta\alpha_2$ for light incident on the display device 1200 illustrated above with respect to FIGS. 12A and 12B, in which relatively high diffraction efficiency can be obtained. The first range 1324A can correspond to a range of off-axis incident angles outside of which the intensity of the first reflected light beam 1320A falls off by more than, e.g., 1/e. For example, the first range 1324A can have values of, $\theta_{inc,1}\pm3°$, $\theta_{inc,1}\pm5°$, $\theta_{inc,1}\pm7°$, $\theta_{inc,1}\pm10°$ or $\theta_{inc,1}\pm20°$.

Referring to FIG. 16B, a second cholesteric liquid crystal (CLC) layer 1358B different from the first CLC layer 1358A comprising a second plurality of chiral structures having a second helical pitch ($p_2$) different from the first helical pitch $p_1$ of the first CLC layer 1358A of FIG. 16A.

As illustrated, the second CLC layer 1358B is configured such that when a second incident light beam 1316B is directed to an incident surface of the CLC layer 1358B at a second off-axis angle $\theta_{inc,2}$ different from the first off-axis angle $\theta_{inc,1}$, a second reflected light beam 1320B having a second reflection angle $\theta_2$ different from the first reflection angle $\theta_1$ is generated As illustrated, the CLC layer 1358B is further configured to have a second range 1324B of off-axis angles, similar to the first range 1324A described above with respect to FIG. 16A.

Figure 17:
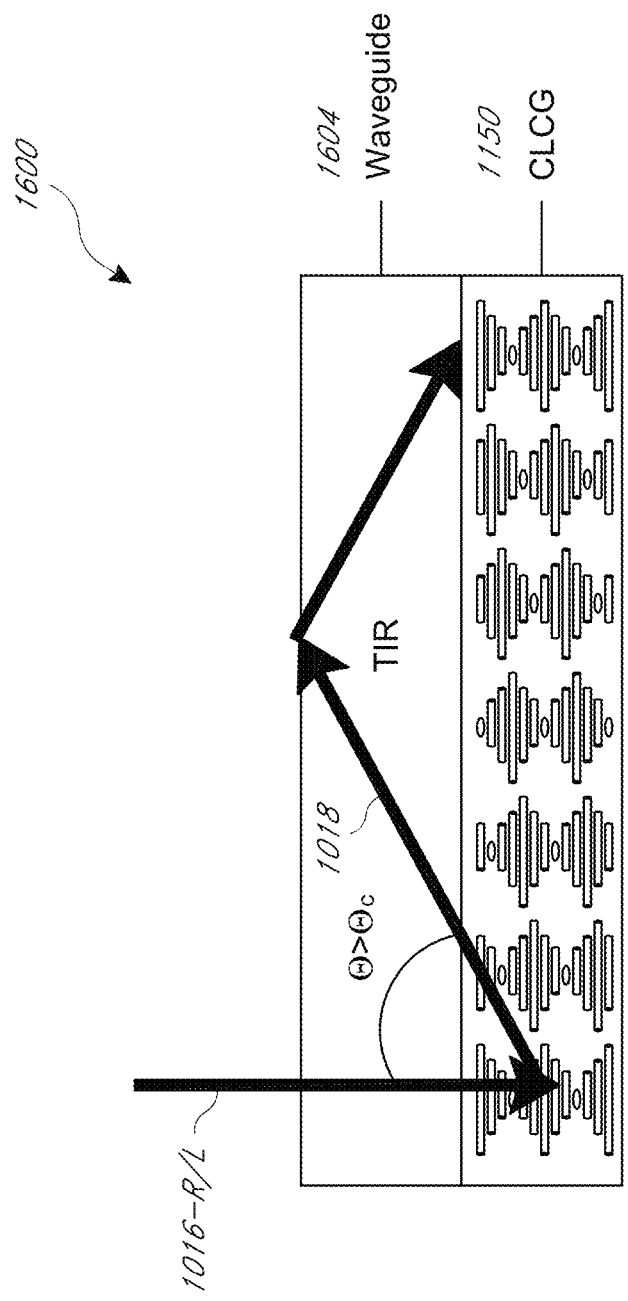
FIG. 17 illustrates a waveguide having formed thereon a CLC diffraction grating and configured to propagate light by total internal reflection (TIR).

As described supra, for various applications including in-coupling and out-coupling of light, a wave guide device can be configured to propagate light by total internal reflection (TIR). FIG. 17 illustrates an example of an optical wave-guiding device 1600 comprising a waveguide 1604 coupled to a CLCG 1150. The wave-guiding device 1600 can correspond to, e.g., the display device 1000 described above with respect to FIGS. 10, where the waveguide 1604 can correspond to the waveguides 1004 and the CLCG 1150 corresponds to the diffraction grating 1008. The CLCG 1150 comprises liquid crystal molecules arranged as a plurality of chiral structures as described supra. The waveguide 1604 is disposed over the CLCG 1150 and optically coupled to the CLCG 1150. When elliptically/circularly polarized incident light 1016-R/L has a polarization handedness which matches the direction of rotation of the liquid crystal molecules of the chiral structures, the incident light 1016-R/L is Bragg-reflected by the CLCG 1150 and coupled into the waveguide 1604 at an angle such that the coupled light travels in a lateral direction (e.g., x-direction), by total internal reflection (TIR). Without being bound to any theory, the TIR condition can be satisfied when the diffraction angle θ is greater than the critical angle, $\theta_C$, of the waveguide. Under some circumstances, the TIR condition can be expressed as:

$$\sin(\theta_C) = 1/n_t \quad [5]$$

where $n_t$ is the refractive index of the waveguide 1604. According to various embodiments, $n_t$ may be between about 1 and about 2 between about 1.4 and about 1.8 or between about 1.5 and about 1.7. For example, the waveguide may comprise a polymer such as polycarbonate or a glass.

Figure 18A:
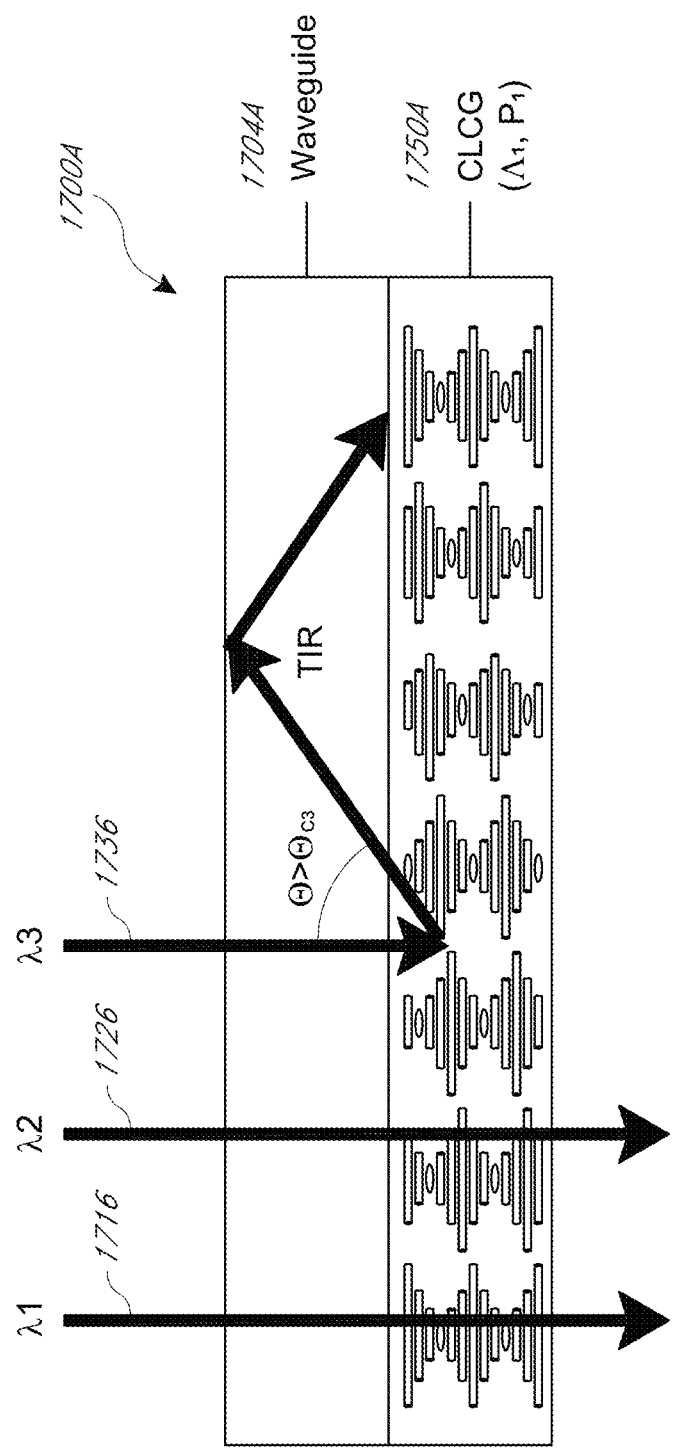
FIG. 18A illustrates a waveguide having formed thereon a CLC diffraction grating and configured to selectively propagate light having a wavelength by total internal reflection (TIR).

FIG. 18A illustrates a first optical wave-guiding device 1700A comprising a first waveguide 1704A coupled to a first CLCG 1750A and configured to propagate light having a third wavelength $\lambda_3$ by total internal reflection (TIR) when $\theta > \theta_{c3}$. The wave-guiding device 1700A can correspond to, e.g., the display device 1200 described above with respect to FIGS. 12A and 12B, where the waveguide 1704A can correspond to one of waveguides 1004 or 1204 and where the CLCG 1750A can corresponds to one of diffraction gratings 1008 or 1208. The first CLCG 1750A has a first period $\Lambda_1$ and a first helical pitch $p_1$. According to some embodiments, the first wave-guiding device 1700A may be configured for propagating light by TIR in the visible spectrum (e.g., with wavelengths between about 400 nm and 700 nm). According to some other embodiments, the first wave-guiding device 1700A may be configured for propagating light by TIR in the infrared spectrum (e.g., in the near-infrared portion of the spectrum with wavelengths between about 700 nm and 1400 nm). As described above, Bragg-reflection occurs at a wavelength expressed by Eq. [2]

supra and within a bandwidth of wavelength Δλ expressed by Eq. [3] supra. For example, the first CLCG 1750A may be designed for coupling by TIR third incident light 1736 having a third wavelength $\lambda_3$ in one of blue color (e.g., about 450 nm), green color (e.g., about 550 nm), red color (e.g., about 650 nm) or in the infrared. As illustrated, when Δλ is about 60 nm, about 80 nm or about 100 nm, as described supra, first and second light 1716 and 1726 having first and second wavelengths $\lambda_1$, $\lambda_2$ are substantially transmitted because Eq. [2] is not satisfied for these colors, which are not coupled into the first waveguide 1704 because Eq. [5] is not satisfied.

Figure 18B:
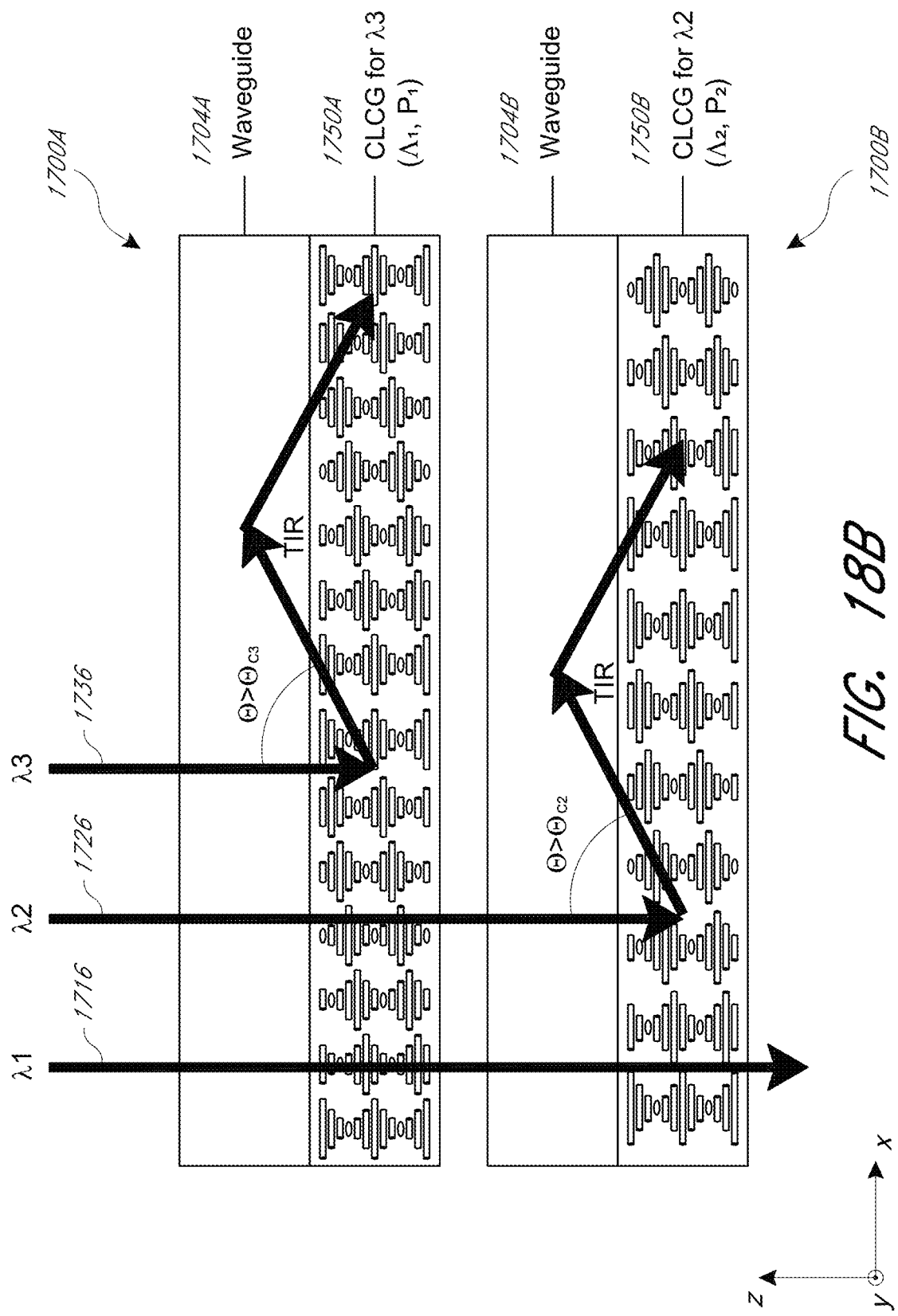
FIG. 18B illustrates two waveguides in the same optical path, where each waveguide has formed thereon a CLC diffraction grating and configured to selectively propagate light having a wavelength by total internal reflection (TIR).

FIG. 18B illustrates a second optical wave-guiding device 1700B combined with the first optical wave-guiding device 1700A illustrated above with respect to FIG. 18A. The optical wave-guiding device 1700B is disposed in the optical path subsequent to the optical wave-guiding device 1700A, and comprises a second waveguide 1704B coupled to a second CLCG 1750B and configured to propagate second light 1726 having a second wavelength $\lambda_2$ by total internal reflection (TIR) when $\theta > \theta_{c2}$. The wave-guiding device 1700B can correspond to, e.g., the display device 1200 described above with respect to FIGS. 12A and 12B, where the waveguides 1704A and 1704B can correspond to waveguides 1004 or 1204, respectively, and where the CLCG 1750A and CLCG 1750B can corresponds to diffraction gratings 1008 or 1208, respectively. The second CLCG 1750B has a second period $\Lambda_2$ and a second helical pitch $p_2$. As described above with respect to FIG. 18A, first and second light 1716 and 1726 having first and second wavelengths of $\lambda_1$, $\lambda_2$ are substantially transmitted through the first optical wave-guiding device 1700A. Of the transmitted first and second light 1716 and 1726, the second CLCG 1750B may be designed for coupling by TIR the second incident light 1726 having the second wavelength $\lambda_2$ in transmitted one of blue color (e.g., about 450 nm), green color (e.g., about 550 nm), red color (e.g., about 650 nm) or infrared, when $\theta > \theta_{c2}$. Thus, as illustrated, when Δλ is about 60 nm, about 80 nm or about 100 nm, as described supra, first light 1716 having the first wavelength $\lambda_1$ is substantially transmitted further through the second wave-guiding device 1700B.

Figure 18C:
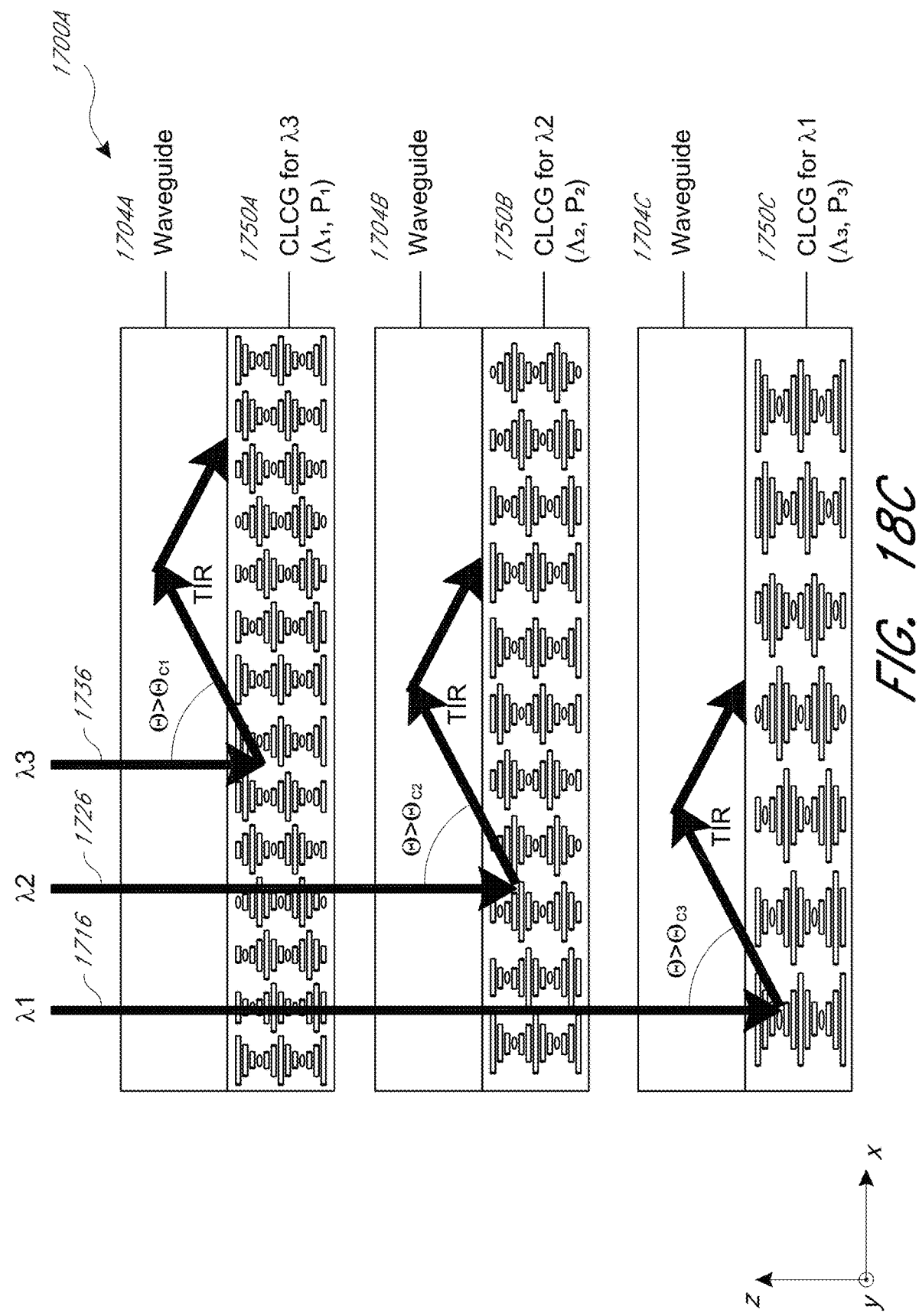
FIG. 18C illustrates three wave guides in the same optical path, each comprising a waveguide coupled to a CLCG and configured to selectively propagate light having a wavelength by total internal reflection (TIR).

FIG. 18C illustrates a third optical wave-guiding device 1700C combined the first and second optical wave-guiding devices 1700A and 1700B illustrated above with respect to FIG. 18B. The third optical wave-guiding device 1700C is disposed in the optical path subsequent to the first and second optical wave-guiding devices 1700A and 1700B, and comprises a third waveguide 1704C coupled to a third CLCG 1750C and configured to propagate first light 1716 having a first wavelength $\lambda_2$ by total internal reflection (TIR) when $\theta > \theta_{c1}$. The wave-guiding device 1700C can correspond to, e.g., the display device 1400B described above with respect to FIG. 14B, where the waveguides 1704A, 1704B and 1704C can correspond to waveguides 1004, 1204 and 1304, respectively, and where the CLCG 1750A, CLCG 1750B and CLCG 1750C can corresponds to diffraction gratings 1008, 1208 and 1308, respectively. The third CLCG 1750C has a third period $\Lambda_3$ and a third helical pitch $p_3$. As described above with respect to FIG. 18B, first light 1716 having first wavelength $\lambda_1$ is substantially is transmitted through the first and second wave-guiding devices 1700A and 1700B. The third CLCG 1750C may be designed for coupling by TIR the first incident light 1716 having the first wavelength $\lambda_1$ in transmitted one of blue color (e.g., about 450 nm), green color (e.g., about 550 nm), red color (e.g., about 650 nm) or infrared when $\theta > \theta_{c1}$. Thus, as illustrated, when Δλ is about 60 nm, about 80 nm or about 100 nm, as described supra, first light 1716 having the first wavelength $\lambda_1$ is substantially coupled into the third waveguide 1704C because Eq. [5] is satisfied.

Thus, as described above with respect to FIGS. 18A-18C, by placing one or more of the first, second and third optical wave-guiding devices 1700A, 1700B and 1700C in the same optical path, one or more of first, second and third light 1716, 1726 and 1736 having different wavelengths $\lambda_1$, $\lambda_2$ and $\lambda_3$ can be coupled to propagate by TIR in one of first, second and third waveguides 1704A, 1704B and 1704C, respectively. While in each of FIGS. 18A-18C, each of the first to third optical wave-guiding devices 1704A, 1704B and 1704C has a dedicated first to third waveguides 1704A, 1704B and 1704C, respectively, and a dedicated first to third CLCGs 1750A, 1750B and 1750C, embodiments are not so limited. For example, a single waveguide can couple by TIR Bragg-reflected light from a stack of a plurality of CLCGs. In addition, any suitable number of optical wave-guiding devices greater than three (or less than three) can also be combined for further selective coupling by Bragg-reflection.

As described above with respect to FIGS. 18A-18C, first to third CLCGs 1750A, 1750B, 1750C have first to third periods $\Lambda_1$, $\Lambda_2$ and $\Lambda_3$, respectively and first to third helical pitches $p_1$, $p_2$ and $p_3$, respectively. In various embodiments, each of the CLCGs can be configured such that the wavelength/period ratio λ/Λ is between about 0.3 and 2.3, between about 0.8 and 1.8 or between about 1.1 and about 1.5, for instance about 1.3. Alternatively, the period (Λ) can be configured to be between about 1 nm and 250 nm smaller, between about 50 nm and 200 nm smaller or between about 80 nm and 170 nm smaller, than the respective wavelength (λ) that the CLCGs are configured for Bragg reflection. For example, when $\lambda_1$, $\lambda_2$ and $\lambda_3$ are within the visible range, e.g., about 620 nm to about 780 nm, for instance about 650 nm (red), about 492 nm to about 577 nm, for instance 550 nm (green), and about 435 nm to about 493 nm, for instance about 450 nm (blue), respectively, the corresponding periods $\Lambda_1$, $\Lambda_2$ and $\Lambda_3$ can be about 450 nm to about 550 nm, for instance about 500 nm, about 373 nm to about 473 nm, for instance about 423 nm, and about 296 nm to about 396 nm, for instance about 346 nm, respectively. Alternatively, when $\lambda_1$, $\lambda_2$ and $\lambda_3$ are in the infrared range, e.g., in the near infrared range between about 750 nm to about 1400 nm, for instance about 850 nm, the corresponding periods $\Lambda_1$, $\Lambda_2$ and $\Lambda_3$ can be about 975 nm to about 1820 nm, for instance about 1105 nm. In addition, various embodiments, each of the CLCGs can be configured such that the wavelength/helical pitch ratio λ/p is between about 0.6 and 2.6, between about 1.1 and 2.1 or between about 1.4 and about 1.8, for instance about 1.6. Alternatively, the helical pitch (p) can be configured to be between about 50 nm and 350 nm smaller, between about 100 nm and 300 nm smaller or between about 140 nm and 280 nm smaller, than the respective wavelength (λ) that the CLCGs are configured for Bragg reflection. For example, when $\lambda_1$, $\lambda_2$ and $\lambda_3$ are about 620 nm to about 780 nm, for instance about 650 nm (red), about 492 nm to about 577 nm, for instance 550 nm (green), and about 435 nm to about 493 nm, for instance about 450 nm (blue), respectively, the corresponding helical pitches $p_1$, $p_2$ and $p_3$ can be about 350 nm to about 450 nm, for instance about 400 nm, about 290 nm to about 390 nm, for instance about 340 nm and about 230 nm to about 330 nm, for instance about 280 nm, respectively. Alternatively, when $\lambda_1$, $\lambda_2$ and $\lambda_3$ are in the infrared range, e.g., in the near infrared range between about 750 nm to about 1400 nm, for instance about 850 nm, the corresponding periods $\Lambda_1$, $\Lambda_2$ and $\Lambda_3$ can be about 1200 nm to about 2240 nm, for instance about 1360 nm.

Additional Aspects

In a $1^{st}$ example, an optical device comprises a plurality of waveguides formed over one another and having formed thereon respective diffraction gratings, wherein the respective diffraction gratings are configured to diffract visible light incident thereon into respective waveguides, such that visible light diffracted into the respective waveguides propagates therewithin. The respective diffraction gratings are configured to diffract the visible light into the respective waveguides within respective field of views (FOVs) with respect to layer normal directions of the respective waveguides. The respective FOVs are such that the plurality of waveguides are configured to diffract the visible light within a combined FOV that is continuous and greater than each of the respective FOVs.

In a $2^{nd}$ example, in the optical device of the $1^{st}$ example, the plurality of waveguides are formed of a material whose refractive index is smaller than an effective refractive index of the respective diffraction gratings, such that the visible light diffracted into the respective waveguides propagates therewithin under total internal reflection.

In a $3^{rd}$ example, in the optical device of the $1^{st}$ or $2^{nd}$ examples, the plurality of waveguides are in a stacked arrangement and are configured to propagate the visible light in substantially parallel directions under total internal reflection.

In a $4^{th}$ example, in the optical device of the $1^{st}$ to $3^{rd}$ examples, wherein different ones of the respective diffraction gratings are disposed to overlap each other in a lateral direction perpendicular to the layer normal directions.

In a $5^{th}$ example, in the optical device of any one of the $1^{st}$ to $4^{th}$ examples, different ones of the respective FOVs do not overlap by more than 20% on the basis of a sum of the different ones of the respective FOVs.

In a $6^{th}$ example, in the optical device of any one of the $1^{st}$ to $5^{th}$ examples, the plurality of waveguides includes a first waveguide having formed thereon a first diffraction grating configured to partially diffract and to partially transmit the visible light incident thereon, and includes a second waveguide having formed thereon a second diffraction grating configured to at least partially diffract the transmitted visible light from the first diffraction grating incident thereon.

In a $7^{th}$ example, in the optical device of the $6^{th}$ example, the first and second diffraction gratings have different periods and are configured to diffract visible light having different wavelengths while having the same color.

In an $8^{th}$ example, in the optical device of the $6^{th}$ example, the first and second diffraction gratings have substantially the same period and are configured to diffract visible light having substantially the same wavelength.

In a $9^{th}$ example, in the optical device of the $6^{th}$ example, the first and second diffraction gratings have different periods and are configured to diffract visible light having different wavelengths and different colors.

In a $10^{th}$ example, in the optical device of the $9^{th}$ example, the first diffraction grating has a first period and is configured to diffract visible light having a first color, and the second grating has a second period and is configured to diffract visible light having the first color and visible light having a second color.

In an $11^{th}$ example, in the optical device of the $10^{th}$ example, the first color corresponds to a shorter wavelength compared to the second color.

In a $12^{th}$ example, in the optical device of the $10^{th}$ or $11^{th}$ examples, the first diffraction grating is configured to partially diffract visible light having the first color incident thereon within a first FOV, and to partially transmit the visible light having the first color incident thereon within a second FOV, and the second diffraction grating is configured to at least partially diffract the visible light having the first color partially transmitted through the first diffraction grating.

In a $13^{th}$ example, in the optical device of the $12^{th}$ example, the first diffraction grating is configured to substantially transmit the visible light having the second color, and the second diffraction grating is configured to at least partially diffract the visible light having the second color incident within the first FOV.

In a $14^{th}$ example, in the optical device of the $13^{th}$ example, the optical device further comprises a third waveguide having formed thereon a third diffraction grating having a third period and configured to diffract visible light having a third color, wherein the second color corresponds to a shorter wavelength compared to the third color.

In a $15^{th}$ example, in the optical device of the $14^{th}$ example, the second diffraction grating is configured to at least partially transmit the visible light having the second color, and the third diffraction grating is configured to receive and to at least partially diffract within the second FOV the partially transmitted visible light having the second color from the second diffraction grating.

In a $16^{th}$ example, in the optical device of the $15^{th}$ example, the first and second diffraction gratings are configured to substantially transmit the visible light having the third color, and the third diffraction grating is configured to at least partially diffract within the first FOV the visible light having the third color that is transmitted through the first and second diffraction gratings.

In a $17^{th}$ example, an optical system comprises a first waveguide having formed thereon a first diffraction grating. The first diffraction grating has a first period and is configured to diffract light having a first color and incident on the first waveguide within a first FOV. The optical system additionally comprises a second waveguide having formed thereon a second diffraction grating. The second diffraction grating has a second period and is configured to diffract light having the first color and incident on the second waveguide within a second FOV. The first and second diffraction gratings are configured to diffract the light having the first color within respective field of views (FOVs) into the respective waveguides with respect to layer normal directions of the respective waveguides. The respective FOVs are such that the first and second waveguides are configured to diffract the visible light having the first color within a combined FOV that is continuous and greater than each of the first and second FOVs.

In an $18^{th}$ example, in the optical system of the $17^{th}$ example, the first waveguide and the second waveguide are in a stacked configuration, the first waveguide is configured to receive the light having the first color prior to the second waveguide, and the first period is shorter than the second period.

In a $19^{th}$ example, in the optical system of the $18^{th}$ example, the second diffraction grating is configured to diffract the light having the first color within the second FOV after substantially transmitting through the first diffraction grating without substantially diffracting.

In a $20^{th}$ example, in the optical system of the $19^{th}$ example, the first diffraction grating is configured to substantially transmit therethrough without substantially diffracting the light having the second color, wherein the light having the second color has a longer wavelength compared to the light having the first color.

In a 21$^{st}$ example, in the optical system of the 20$^{th}$ example, the second diffraction grating is configured to diffract the light having the second color within the second FOV to be guided in the waveguide.

In a 22$^{nd}$ example, in the optical system of the 17$^{th}$ example, each of the first and second diffraction gratings comprises a cholesteric liquid crystal (CLC) layer.

In a 23$^{rd}$ example, in the optical system of the 20$^{th}$ example, the CLC layer comprises a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. Arrangements of the liquid crystal molecules of the chiral structures vary periodically in a lateral direction perpendicular to the layer depth direction.

In a 24$^{th}$ example, in the optical system of the 20$^{th}$ example, each chiral structure comprises at least three calamitic liquid crystal molecules that are elongated along different elongation directions.

In a 25$^{th}$ example, a display device comprises a first waveguide having formed thereon a first diffraction grating comprising liquid crystals, wherein the first diffraction grating is configured to diffract part of light having a first color incident thereon into the first waveguide. The first diffraction grating is additionally configured to pass therethrough part of the light having the first color incident thereon. The first diffraction grating is further configured to pass therethrough light having a second color. The display device additionally comprises a second waveguide having formed thereon a second diffraction grating comprising liquid crystals, wherein the second diffraction grating is configured to diffract the light having the second color into the second waveguide. The second diffraction grating is further configured to diffract the part of the light having the first color that has passed through the first diffraction grating.

In a 26$^{th}$ example, in the display device of the 25$^{th}$ example, first diffraction grating is configured diffract light having the first color within a first range of angles of incidence relative to a layer normal, and the first diffraction grating is configured to pass therethrough the light having the first color within a second range of angles of incidence relative to the layer normal.

In a 27$^{th}$ example, in the display device of the 26$^{th}$ example, the second diffraction grating is configured diffract the light having the second color incident thereon within the first range of angles, and the second diffraction grating is configured to diffract the light having the first color incident thereon within the second range of angles of incidence In a 28$^{th}$ example, in the display device of the 27$^{th}$ example, the first range of angles and the second range of angles do not overlap by more than 20% on the basis of a sum of the first range of angles and the second range of angles.

In a 29$^{th}$ example, in the display device of any one of the 25$^{th}$ to 28$^{th}$ examples, the first color corresponds to a shorter wavelength compared to the second color.

In a 30$^{th}$ example, in the display device of any one of the 25$^{th}$ to 29$^{th}$ examples, the first diffraction grating comprises periodically varying liquid crystals arranged to have a first period in a lateral direction, and the second diffraction grating comprises periodically varying liquid crystals arranged to have a second period in the lateral direction greater than the first period.

In a 31$^{st}$ example, in the display device of the 30$^{th}$ example, one or both of the first diffraction grating and the second diffraction grating are configured to diffract light having a wavelength and has a period in a lateral direction such that a wavelength/period ratio ($\lambda/\Lambda$) is between about 0.3 and 2.3.

In a 32$^{nd}$ example, in the display device of the 30$^{th}$ example, one or both of the first diffraction grating and the second diffraction grating are configured to diffract light having a wavelength and has a period such that the period is less than the wavelength by 1 nm to 250 nm.

In a 33$^{rd}$ example, in the display device of any one of the 25$^{th}$ to 32$^{nd}$ examples, the liquid crystals comprise cholesteric liquid crystals.

In a 34$^{th}$ example, in the display device of the 33$^{rd}$ example, the liquid crystals of the first diffraction grating has a helical pitch smaller than that of the liquid crystals of the second diffraction grating.

In a 35$^{th}$ example, in the display device of any one of the 25$^{th}$ to 34$^{th}$ examples, one or both of the first diffraction grating and the second diffraction grating are configured to diffract light into the respective waveguides transmissively.

In a 36$^{th}$ example, in the display device of any one of the 25$^{th}$ to 34$^{th}$ examples, one or both of the first diffraction grating and the second diffraction grating are configured to diffract light into the respective waveguides reflectively.

In a 37$^{th}$ example, in the display device of any one of the 25$^{th}$ to 36$^{th}$ examples, the first color is green and the second color is red.

In a 38$^{th}$ example, in the display device of any one of the 25$^{th}$ to 36$^{th}$ examples, the first color is blue and the second color is green.

In a 39$^{th}$ example, a head-mounted display device is configured to project light to an eye of a user to display augmented reality image content. The head-mounted display device comprises a frame configured to be supported on a head of the user. The head-mounted display device additionally comprises a display disposed on the frame. At least a portion of the display comprises a plurality of waveguides. The waveguides are transparent and disposed at a location in front of the user's eye when the user wears the head-mounted display device such that the transparent portion transmits light from a portion of an environment in front of the user to the user's eye to provide a view of the portion of the environment in front of the user. The display further comprises one or more light sources and a plurality of diffraction gratings in the display configured to couple light from the light sources into the waveguides in the display. The waveguides and the diffraction gratings in the display comprise the waveguides and the diffraction gratings according to any one of 1$^{st}$ to 38$^{th}$ examples.

In a 40$^{th}$ example, in the device of the 39$^{th}$ example, the one or more light sources comprises a fiber scanning projector.

In a 41$^{st}$ example, in the device of the 39$^{th}$ or 40$^{th}$ examples, the display is configured to project light into the user's eye so as to present image content to the user on a plurality of depth planes.

Additional Considerations

In the embodiments described above, augmented reality display systems and, more particularly, spatially varying diffraction gratings are described in connection with particular embodiments. It will be understood, however, that the principles and advantages of the embodiments can be used for any other systems, apparatus, or methods with a need for the spatially varying diffraction grating. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of one or more of the items in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. No element or combinations of elements is necessary or indispensable for all embodiments. All suitable combinations and subcombinations of features of this disclosure are intended to fall within the scope of this disclosure.

What is claimed is:

1. An optical device, comprising:
a plurality of waveguides formed over one another and having formed thereon respective diffraction gratings, wherein the respective diffraction gratings are configured to diffract visible light incident thereon into respective waveguides, such that visible light diffracted into the respective waveguides propagates therewithin,
wherein the respective diffraction gratings are configured to diffract the visible light incident on the respective waveguides within respective field of views (FOVs) into the respective waveguides with respect to layer normal directions of the respective waveguides, and wherein the respective FOVs are such that the plurality of waveguides are configured to diffract the visible light within a combined FOV that is continuous and greater than each of the respective FOVs,
wherein the plurality of waveguides includes a first waveguide having formed thereon a first diffraction grating configured to partially diffract and to partially transmit the visible light incident thereon, and includes a second waveguide having formed thereon a second diffraction grating configured to at least partially diffract the transmitted visible light from the first diffraction grating incident thereon, and
wherein the first and second diffraction gratings have different periods and are configured to diffract visible light having different wavelengths and different colors,
wherein the first diffraction grating has a first period and is configured to diffract visible light having a first color, and wherein the second grating has a second period and is configured to diffract visible light having the first color and visible light having a second color, wherein the first color corresponds to a shorter wavelength than the second color,
wherein the first diffraction grating is configured to partially diffract visible light having the first color incident thereon within a first FOV with a diffraction efficiency exceeding about 80%, and to partially transmit the visible light having the first color incident thereon within a second FOV with a transmission efficiency exceeding about 80%,
and wherein the second diffraction grating is configured to at least partially diffract the visible light having the first color partially transmitted through the first diffraction grating within the second FOV with a diffraction efficiency exceeding about 80%,
wherein the first diffraction grating is configured to substantially transmit the visible light having the second color within the first FOV, and wherein the second diffraction grating is configured to at least partially diffract the visible light having the second color incident within the first FOV,
wherein the first diffraction grating comprises periodically varying liquid crystals arranged to have a first period in a lateral direction, and wherein the second diffraction grating comprises periodically varying liquid crystals arranged to have a second period in the lateral direction that is greater than the first period, and wherein the periodically varying liquid crystals of the first diffraction grating have a helical pitch that is smaller than a helical pitch of the periodically varying liquid crystals of the second diffraction grating.

2. The optical device of claim 1, wherein the liquid crystal diffraction gratings comprise cholesteric liquid crystals.

3. The optical device of claim 1, wherein the first diffraction grating has a wavelength/period ratio $\lambda/A$ between about 0.5 and 0.8, wherein $\lambda$ is a wavelength of light partially diffracted by the first grating, and wherein A is the period of the first diffraction grating.

4. The optical device of claim 1, wherein the second diffraction grating has a wavelength/period ratio $\lambda/A$ between about 0.5 and 0.8, wherein 2 is a wavelength of light partially diffracted by the second grating, and wherein A is the period of the second diffraction grating.

5. The optical device of claim 1, wherein one or both of the first diffraction grating and the second diffraction grating are configured to diffract light into the respective waveguides transmissively.

6. The optical device of claim 1, wherein one or both of the first diffraction grating and the second diffraction grating are configured to diffract light into the respective waveguides reflectively.

7. The optical device of claim 1, wherein the first diffraction grating is configured to diffract visible light having a first color, and wherein the second diffraction grating is configured to diffract visible light having a second color, wherein the first color is green and the second color is red.

8. The optical device of claim 1, wherein the first diffraction grating is configured to diffract visible light having a first color, and wherein the second diffraction grating is configured to diffract visible light having a second color, wherein the first color is blue and the second color is green.

9. The optical device of claim 1, wherein the plurality of waveguides are formed of a material whose refractive index is smaller than an effective refractive index of the respective diffraction gratings, such that the visible light diffracted into the respective waveguides propagates therewithin under total internal reflection.

10. The optical device of claim 1, wherein the plurality of waveguides are in a stacked arrangement and are configured to propagate the visible light in substantially parallel directions under total internal reflection.

11. The optical device of claim 1, wherein different ones of the respective diffraction gratings are disposed to overlap each other in a lateral direction perpendicular to the layer normal directions.

12. The optical device of claim 1, wherein different ones of the respective FOVs do not overlap by more than 20% on the basis of a sum of the different ones of the respective FOVs.

13. The optical device of claim 1, comprising a third waveguide having formed thereon a third diffraction grating having a third period and configured to diffract visible light having a third color, wherein the second color corresponds to a shorter wavelength than the third color.

* * * * *